United States Patent
Aihara et al.

(10) Patent No.: US 8,365,643 B2
(45) Date of Patent: Feb. 5, 2013

(54) BAND SAW MACHINE, AND SAW BLADE INSTALLATION METHOD IN BAND SAW MACHINE, SAW BLADE DRIVING METHOD, AND CUTTING METHOD

(75) Inventors: Shoji Aihara, Kanagawa (JP); Minoru Gotoh, Kanagawa (JP); Fumiaki Nemoto, Kanagawa (JP); Akio Seto, Kanagawa (JP)

(73) Assignee: Amada Company, Limited, Kanagawa (JP)

( * ) Notice: Subject to any disclaimer, the term of this patent is extended or adjusted under 35 U.S.C. 154(b) by 0 days.

(21) Appl. No.: 12/621,101

(22) Filed: Nov. 18, 2009

(65) Prior Publication Data
US 2010/0071527 A1    Mar. 25, 2010

Related U.S. Application Data

(62) Division of application No. 10/578,440, filed as application No. PCT/JP2004/016312 on Nov. 4, 2004.

(30) Foreign Application Priority Data

Nov. 6, 2003  (JP) .................................. 2003-376790
May 10, 2004  (JP) .................................. 2004-139690
May 18, 2004  (JP) .................................. 2004-147415

(51) Int. Cl.
  *B27B 15/02* (2006.01)
(52) U.S. Cl. ................ 83/813; 83/809; 83/788
(58) Field of Classification Search ............ 83/788, 83/794, 807, 809–813
See application file for complete search history.

(56) References Cited

U.S. PATENT DOCUMENTS

| 125,638 | A |   | 4/1872  | Warth |
|---|---|---|---|---|
| 169,035 | A | * | 10/1875 | Pryibil ............................ 83/788 |
| 1,152,696 | A | * | 9/1915 | Berry ............................. 83/799 |
| 2,081,033 | A |   | 5/1937 | Biro |
| 2,602,987 | A | * | 7/1952 | Wells ............................. 83/62 |
| 2,621,693 | A |   | 12/1952 | Grills |
| 2,670,771 | A |   | 3/1954 | Lockwood et al. |
| 2,725,702 | A |   | 12/1955 | Ross |
| 2,898,669 | A |   | 8/1959 | Crane et al. |
| 3,077,132 | A |   | 2/1963 | Whitmore |
| 3,182,538 | A |   | 5/1965 | Whitmore et al. |
| RE25,901 | E |   | 11/1965 | Whitmore |
| 3,280,862 | A |   | 10/1966 | Foley |
| 3,393,538 | A |   | 7/1968 | Christian |
| 3,485,123 | A | * | 12/1969 | Komendowski ............... 83/168 |
| 3,680,417 | A |   | 8/1972 | Wells |
| 3,680,421 | A |   | 8/1972 | Conner et al. |
| 3,801,089 | A |   | 4/1974 | Fukugami et al. |
| 3,830,131 | A |   | 8/1974 | Wells |
| 3,889,567 | A | * | 6/1975 | Sato et al. ...................... 83/818 |

(Continued)

FOREIGN PATENT DOCUMENTS

EP  0967041  12/1999
JP  45-31116  11/1970

(Continued)

*Primary Examiner* — Sean Michalski
(74) *Attorney, Agent, or Firm* — Greenblum & Bernstein, P.L.C.

(57) ABSTRACT

A band saw machine which has an endless band saw blade hung around a driving wheel and a driven wheel rotatably supported by a saw blade housing that is capable of moving vertically. The band saw machine also includes a pair of guide posts for vertically guiding the saw blade housing between the driving wheel and the driven wheel, wherein an upper traveling part of the band saw blade is disposed at one side of the front and rear sides of the guide posts, and a lower traveling part of the band saw blade is disposed at the other side of the front and rear sides of the guide posts.

3 Claims, 29 Drawing Sheets

U.S. PATENT DOCUMENTS

| | | | |
|---|---|---|---|
| 4,222,295 A * | 9/1980 | Sawamura | 83/169 |
| 4,478,120 A * | 10/1984 | Sugimoto | 83/74 |
| 4,487,097 A * | 12/1984 | Hara et al. | 83/56 |
| 5,062,335 A | 11/1991 | Missler | |
| 5,109,744 A | 5/1992 | Syre et al. | |
| 5,188,002 A | 2/1993 | Wolf et al. | |
| 5,408,910 A | 4/1995 | Ohnishi et al. | |
| 7,546,788 B2 | 6/2009 | Tokiwa | |
| 2002/0073818 A1* | 6/2002 | Stolzer | 83/206 |
| 2007/0028745 A1* | 2/2007 | Wang | 83/813 |
| 2008/0276775 A1* | 11/2008 | Hewitt et al. | 83/56 |
| 2009/0288541 A1* | 11/2009 | Diener | 83/810 |

FOREIGN PATENT DOCUMENTS

| | | |
|---|---|---|
| JP | 46-1489 | 1/1971 |
| JP | 55-137826 | 10/1980 |
| JP | 57-127621 | 8/1982 |
| JP | 60-52218 | 3/1985 |
| JP | 62-050015 | 3/1987 |
| JP | 63-039718 | 2/1988 |
| JP | 1-301014 | 12/1989 |
| JP | 2725782 | 12/1997 |
| JP | 11-104915 | 4/1999 |
| JP | 2001-179535 | 7/2001 |
| JP | 2004-042210 | 2/2004 |

* cited by examiner

FIG. 23
(A)
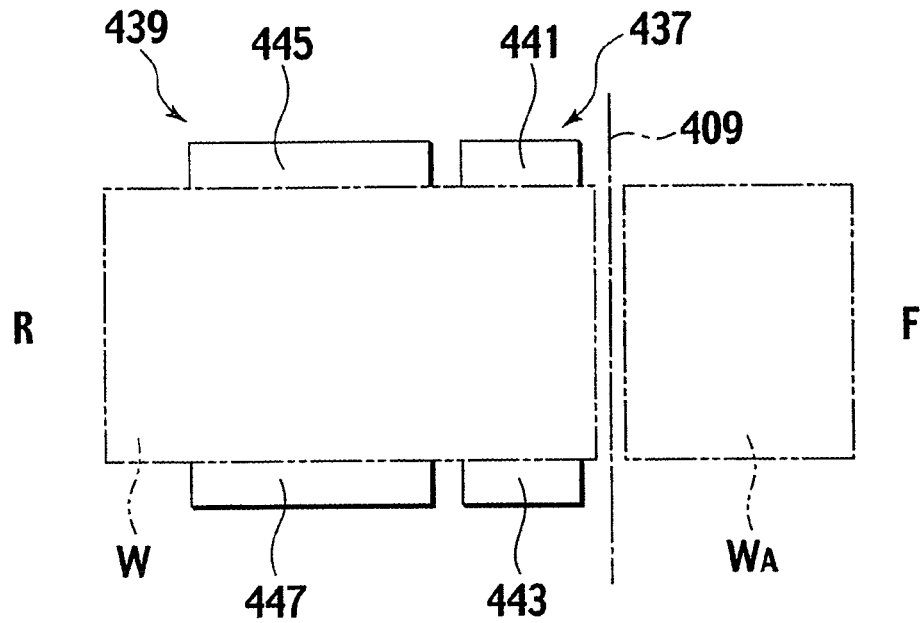
(B)
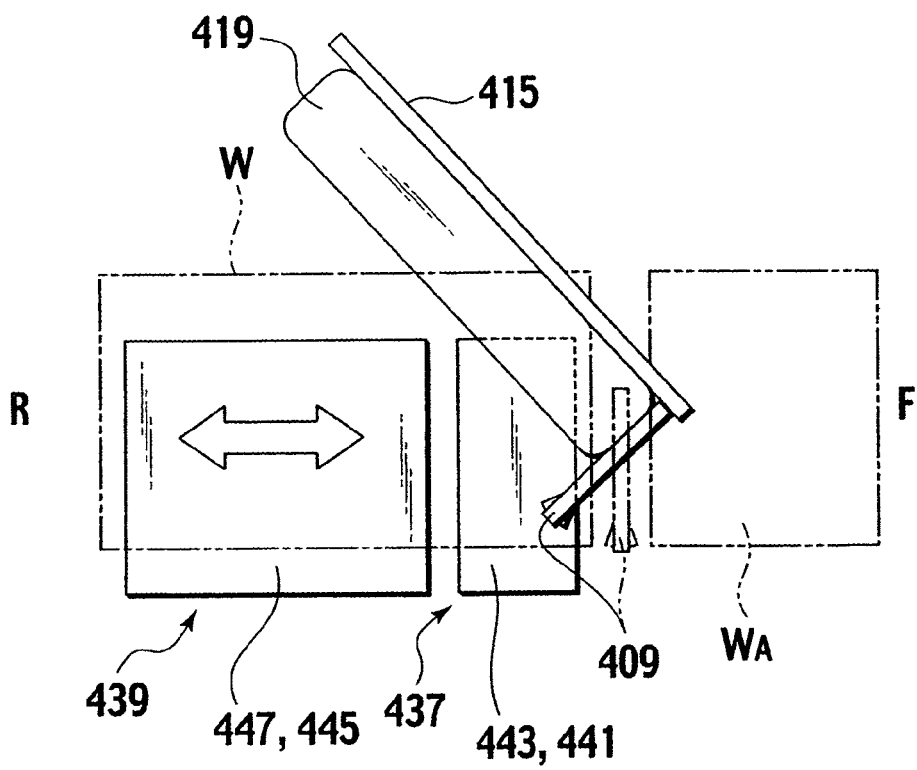

FIG. 24
(A)
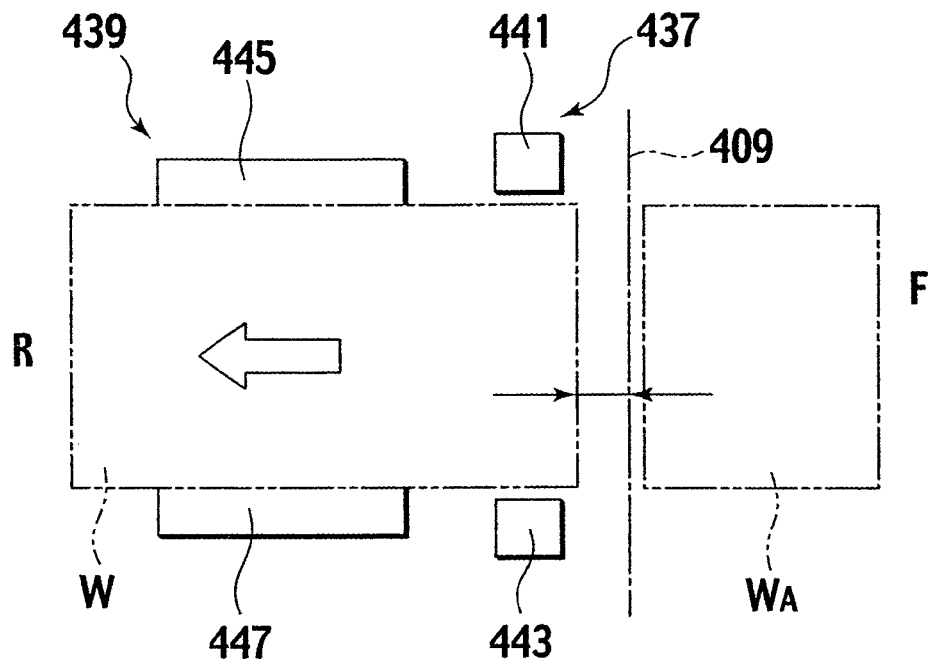
(B)
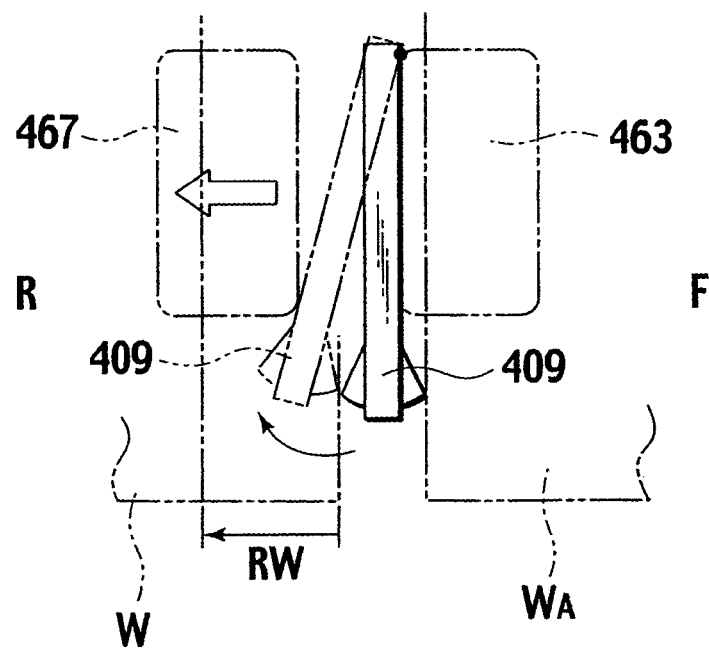

FIG. 25
(A)
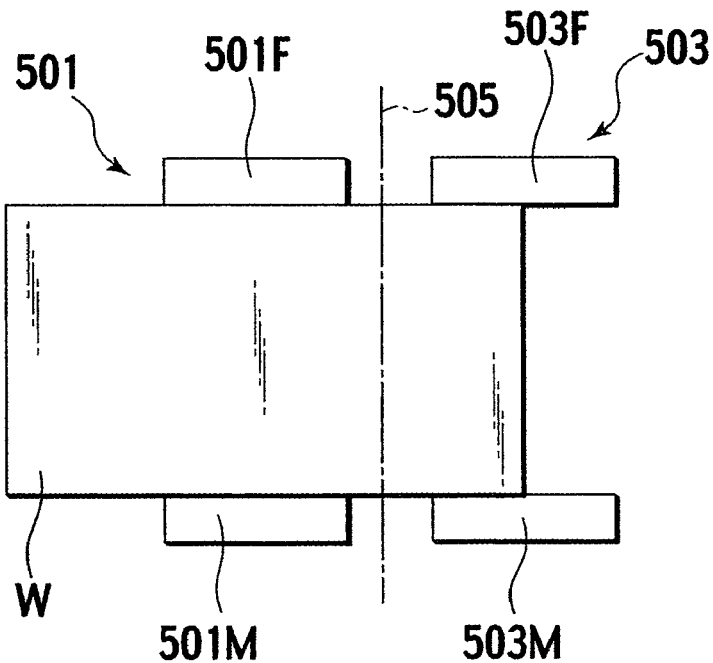
(B)
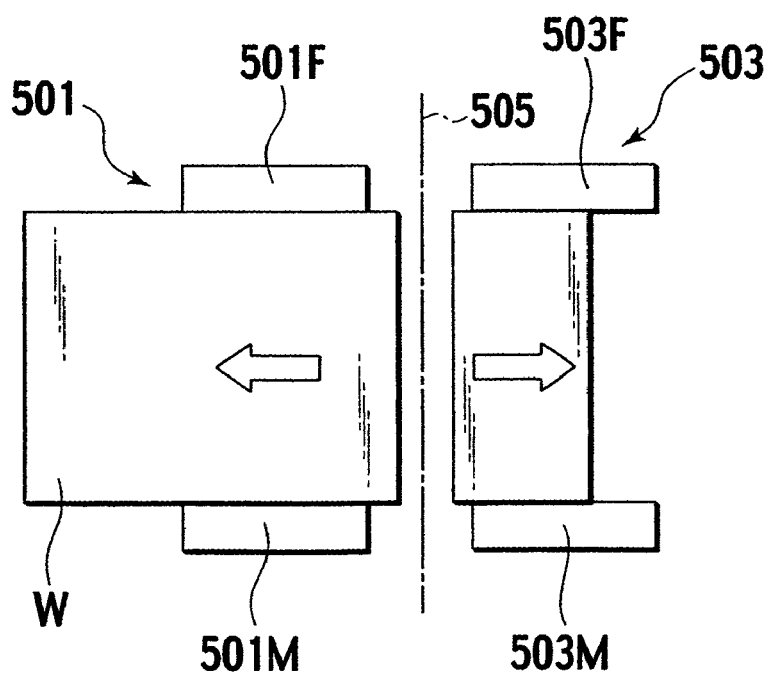

BAND SAW MACHINE, AND SAW BLADE INSTALLATION METHOD IN BAND SAW MACHINE, SAW BLADE DRIVING METHOD, AND CUTTING METHOD

CROSS-REFERENCE TO RELATED APPLICATION

This application is a divisional of U.S. patent application Ser. No. 10/578,440, filed May 5, 2006, which is a National Stage Application of International Application No. PCT/JP04/016312, filed Nov. 4, 2004, which claims priority to Japanese Patent Application Nos. 2003-376790, filed Nov. 6, 2003, 2004-139690, filed May 10, 2004 and 2004-147415 filed May 18, 2004, the contents of which are expressly incorporated by reference herein in their entirety.

TECHNICAL FIELD

The present invention relates to a band saw machine, and a saw blade attaching method, a saw blade driving method and a cutting method of the band saw machine. In more detail, the present invention relates to a double-post horizontal band saw machine, a saw blade attaching method of the band saw machine, a saw blade driving method for reducing a cutting impact force caused on a saw blade when a material to be cut is cut, extending the life of the saw blade and reducing vibration and noise, and a cutting method.

BACKGROUND ART

A horizontal band saw machine has a configuration in which a saw blade housing is provided on a base frame having vise device that can fixedly hold a work so as to be vertically movable, the saw blade housing has a driving wheel and driven wheel that are rotatably provided separately from each other in the horizontal direction and an endless band saw blade is wound around the driving wheel and the driven wheel. When the saw blade housing lowers from the risen position, the band saw blade cuts the work.

According to a first background art, in a conventional horizontal band saw machine, upper and lower straight saw blade traveling parts are formed between the driving wheel and the driven wheel and generally, the lower traveling part of the band saw blade cuts the work. With this configuration, there is a problem that the vertical dimension of the whole horizontal band saw machine becomes larger.

Thus, the configuration in which the upper traveling part of the band saw blade cuts the work is also proposed (for example, U.S. Pat. Nos. 5,062,335, 3,182,538 and 2898669).

With the configuration described in two of the U.S. patent publications, the driving wheel and the driven wheel are rotatably provided at the front side of the saw blade housing vertically supported by a pair of guide posts so as to separate from each other in the horizontal direction and the endless band saw blade is hung around the driving wheel and the driven wheel.

When tension is applied to the band saw blade, the saw blade housing receives the tension through the driving wheel and the driven wheel. Accordingly, when a large tension is applied to the band saw blade, the stiffness of the saw blade housing needs to be improved and thus, the whole configuration becomes larger.

Furthermore, since the saw blade housing is supported being protruded forwards from the guide posts and the driving wheel and the driven wheel are rotatably supported in front of the saw blade housing, the protruded amount of the wheel from the guide posts is large and thus, vibration is easy to occur when the band saw blade cuts the work. Moreover, the dimension in the cross direction becomes larger, thereby making miniaturization difficult.

Next, according to a second background art, some conventional band saw machine have an automatic band saw blade exchange device. However, the band saw blade in the horizontal band saw machine is generally exchanged by the operator's hand. The manual exchange operation by the operator is carried out according to the following method.

An upper traveling part of the band saw blade is fixedly inserted into a saw blade insert of the saw blade guide and the remaining part of the band saw blade is attached to the driving wheel and the driven wheel. When the band saw blade is removed, the above-mentioned procedure is performed in the reverse order.

The above-mentioned conventional method for attaching the band saw blade has the following problems. That is, when the part other than the upper traveling part is attached to the driving wheel and the driven wheel, the direction is not stable due to small stiffness of the circular band saw blade and thus, it is difficult to attach the part to the driving wheel and the driven wheel. Furthermore, since the direction of the band saw blade is not stable, the edge of the band saw blade contacts against the band saw machine main unit, thereby causing damage of the edge or the main unit.

Next, according to a third background art, in the conventional band saw machine, the endless band saw blade is wound around the driving wheel and the driven wheel and the work cramped by the vise device is cut with the band saw blade of which driving wheel is rotationally driven by an electric saw blade motor and rotationally travels. The saw machine is provided with a fixed insert for guiding the band saw blade and a moving insert that moves relative to the fixed insert in response to a cut width of the work to guide the band saw blade.

An output shaft of a speed reducer is directly attached to the center of the driving wheel for rotationally driving the band saw blade. An input shaft of the speed reducer includes two types of one in which power of the electric saw blade motor is transmitted by a coupling and one in which the power is transmitted by a pulley belt (refer to Patent document 1, for example). In the other type of the saw machine, a plurality of wheels around which the endless band saw blade is wound are each driven by the saw blade motor (Japanese Patent No. 2725782).

The conventional saw machine is devised so as to efficiently transmit torque of the saw blade motor to the band saw blade and however, is not devised so as to reduce impact force of saw blade cutting resistance generated during cutting. For this reason, when a large impact force is applied to the band saw blade, this contributes to damage of the band saw blade as well as vibration and noise.

To solve the above-mentioned problem, a first object of the present invention is to provide a band saw machine in which protruded amount of the wheels from the guide posts is small, vibration generated when the work is cut with the band saw blade can be suppressed and the dimension in the cross direction can be reduced, thereby enabling miniaturization.

A second object of the present invention is to provide a band saw blade attaching auxiliary means in the double-post horizontal band saw machine using a circular band saw blade in which an edge of the band saw blade can be easily attached to a band saw machine main unit without touching the main unit when the operator attaches the band saw blade to the driving wheel and the driven wheel, and a band saw blade attaching method using the device.

Furthermore, the third object of the present invention is to provide a band saw machine and a saw blade driving method in which the impact force of the saw blade cutting resistance generated during cutting can be reduced, damage of the band saw blade can be prevented and vibration and noise can be reduced.

DISCLOSURE OF THE INVENTION

To achieve the above-mentioned objects, a band saw machine according to a first aspect of the present invention is a band saw machine in which an endless band saw blade is hung around a driving wheel and a driven wheel rotatably supported by a saw blade housing capable of vertically moving and is characterized by that: a pair of guide posts for vertically guiding the saw blade housing is provided between the driving wheel and the driven wheel; an upper traveling part of the band saw blade is disposed at one side of the front and rear sides of the guide posts; and an lower traveling part of the band saw blade is disposed at the other side of the front and rear sides of the guide posts.

In a band saw machine according to a second aspect of the present invention depending from the first aspect, when the band saw machine is viewed from the side, an intersection point between centers of both the wheels and a center line of the wheel width is located at a position almost equal to the width of the guide posts or within the width.

In a band saw machine according to a third aspect of the present invention depending from the first aspect or the second aspect, a blade of the upper traveling part of the band saw blade is bent to be vertically oriented downwards; and a center of gravity is positioned at a lower part of the inclined saw blade housing.

In a band saw machine according to a fourth aspect of the present invention depending from any of the first aspect to the third aspect, the saw blade housing is opened to the upside and formed in the shape of C; and the upper ends of the pair of guide posts are integrally coupled to each other with a coupling member.

According to the first aspect to the fourth aspect of the present invention, in the band saw machine of the present invention, by receiving the tension of the endless band saw blade hung around the driving wheel and the driven wheel at the pair of guide posts, the size and weight of the saw blade housing can be reduced. Furthermore, since the upper and lower saw blade traveling parts of the band saw blade are located in the front and in the rear of the guide posts, respectively, the dimension in the cross direction can be reduced and vibration generated during cutting of the work can be prevented.

A band saw machine according to a fifth aspect of the present invention includes: a saw blade housing that can move in the vertical direction, a rear part of which is inclined upwards by about 45 degrees relative to a horizontal plane; a pair of guide posts for guiding the saw blade housing so as to be movable in the vertical direction; a driving wheel and a driven wheel that are pivotally supported by the saw blade housing so as to be rotationally driven; a circular band saw blade that is hung around the driving wheel and the driven wheel under appropriate tension and rotationally travels; and a pair of saw blade guides for vertically bending and guiding the band saw blade so that the blade of the horizontal traveling part of the circular band saw blade traveling between the driving wheel and the driven wheel is oriented downwards; and in the above-mentioned configuration, a band saw blade introducing means for introducing an intermediate region of the lower traveling part of the circular band saw blade into the outer peripheries of the driving wheel and driven wheel when the circular band saw blade is attached to the driving wheel and the driven wheel is provided on the front side of the band saw machine.

In a band saw machine according to a sixth aspect of the present invention depending from the fifth aspect or the second aspect, the band saw blade introducing means is formed of an upper band saw blade introducing means provided on both sides of a product receiving table on the front side of the band saw machine and a lower band saw blade introducing means provided at a base of the band saw machine as opposed to the upper band saw blade introducing means; and a slit through which the intermediate region of the lower traveling part of the band saw blade can pass is formed between the upper band saw blade introducing means and the lower band saw blade introducing means.

According to a seventh aspect of the present invention, a saw blade attaching method using a band saw machine which includes: a saw blade housing that can move in the vertical direction, a rear part of which is inclined upwards by about 45 degrees relative to a horizontal plane; a pair of guide posts for guiding the saw blade housing so as to be movable in the vertical direction; a driving wheel and a driven wheel that are pivotally supported by the saw blade housing so as to be rotationally driven; a circular band saw blade that is hung around the driving wheel and the driven wheel under appropriate tension and rotationally travels; a pair of saw blade guides provided at the saw blade housing for vertically bending and guiding the band saw blade so that the blade of the horizontal traveling part of the circular band saw blade traveling between the driving wheel and the driven wheel is oriented downwards; and a band saw blade introducing means having a slit for introducing the intermediate region of the lower traveling part of the circular band saw blade into the outer peripheries of the driving wheel and the driven wheel when the circular band saw blade is attached to the driving wheel and the driven wheel, the method includes:

1. a step of adjusting the saw blade guides at appropriate interval in response to the width of the cut material;

2. a step of inserting the circular band saw blade from above the guide posts;

3. a step of inserting the upper traveling part of the circular band saw blade into the saw blade guides and fixing thereto;

4. a step of inserting the lower traveling part of the circular band saw blade through the slit of the band saw blade introducing means and attaching the lower traveling part of the circular band saw blade to the outer peripheries of the driving wheel and the driven wheel; and 5. a step of applying appropriate tension to the attached band saw blade by a tension applying means.

According to the fifth aspect to the seventh aspect of the present invention, in the band saw machine and the saw blade attaching method of the present invention, the operator can attach the band saw blade by himself/herself easily and safely without requiring any special automatic band saw blade exchanging device.

That is, when the remaining part other than the upper traveling part is attached to the driving wheel and the driven wheel, the direction of the lower traveling part of the circular band saw blade is fixed by inserting the upper traveling part into the slit of the band saw blade guiding means, and thus, the band saw blade can be attached to the outer peripheries of the driving wheel and the driven wheel.

Accordingly, there is no possibility that the band saw blade contacts against the band saw machine main unit resulting in damage of the blade and the device main unit.

Furthermore, according to an eighth aspect, a saw blade driving method in a band saw machine in which an endless saw blade is wound around a driving wheel and a driven wheel rotatably supported by a saw blade housing, the saw blade is rotationally moved by rotationally driving the driving wheel by the saw blade driving unit and a cut material is cut with the rotationally traveling saw blade, includes the steps of:

coupling the saw blade driving unit to the shaft of the driving wheel in the floating state in the saw blade rotating direction with respect to the saw blade housing; controlling the saw blade rotating direction of the saw blade driving unit via a buffer part provided at the saw blade housing; and damping a reaction force caused by the driving of the saw blade by the buffer part.

In a saw blade driving method according to a ninth aspect of the present invention depending from the eighth aspect, the buffer part is a resin material having elasticity.

In a saw blade driving method according to a tenth aspect of the present invention depending from the eighth aspect or the ninth aspect, the buffer part is a spring body.

In a saw blade driving method according to an eleventh aspect of the present invention depending from any of the eighth aspect to the tenth aspect, the buffer part is a damper device.

In a saw blade driving method according to a twelfth aspect of the present invention depending from any of the eighth aspect to the eleventh aspect, the buffer part is a vibration generating device for applying vibration to the saw blade driving unit.

A band saw machine according to a thirteenth aspect of the present invention includes: an endless saw blade wound around a driving wheel and a driven wheel rotatably supported by a saw blade housing; and a saw blade driving unit for rotationally moving the saw blade by rotationally driving the driving wheel, and in the above-mentioned configuration, the saw blade driving unit has a floating structure coupled to the shaft of the driving wheel in a floating state relative to the saw blade housing in the saw blade rotating direction; and a buffer part for controlling the saw blade rotating direction of the saw blade driving unit and damping the reaction force generated by driving of the saw blade is provided at the saw blade housing.

In a saw blade driving method according to a fourteenth aspect of the present invention depending from the thirteenth aspect, the buffer part is formed of a resin material having elasticity.

In a saw blade driving method according to a fifteenth aspect of the present invention depending from the thirteenth aspect or the fourteenth aspect, the buffer part is formed of a spring body.

In a saw blade driving method according to a sixteenth aspect of the present invention depending from any of the thirteenth aspect to the fifteenth aspect, the buffer part is formed of a damper device.

In a saw blade driving method according to a seventeenth aspect of the present invention depending from any of the thirteenth aspect to the sixteenth aspect, the buffer part is formed of a vibration generating device for applying vibration to the saw blade driving unit.

In the band saw machine and the saw blade driving method according to the eighth aspect to the seventeenth aspect, even if saw blade cutting resistance and impact force is applied to the saw blade when the cut material is cut, the saw blade driving unit is in the floating state relative to the saw blade housing in the saw blade rotating direction, and therefore, reaction force is generated about the shaft of the driving wheel in the direction reverse to the saw blade rotating direction and the reaction force is absorbed by elasticity of the buffer part. As a result, damage of the saw blade as well as vibration and noise can be damped or prevented and the life of the saw blade can be extended.

A band saw machine according to an eighteenth aspect includes: a main unit vise for cramping a work in the rear of a cutting position where the work is cut with a band saw blade and a sending vise that is movable in the cross direction for sending the work; a saw blade housing having a driving wheel and a driven wheel around which the band saw blade is wound; and a pair of saw blade guides for bending the band saw blade in the saw blade housing and guiding the band saw blade, and in the above-mentioned configuration, one of a front insert and a rear insert is fixed to a front end of the saw blade guide; and the other of the front insert and the rear insert is provided so as to be movable in the cross direction.

Therefore, in the band saw machine according to the eighteenth aspect of the present invention, since one of the front and rear inserts is fixedly provided at the front end of the saw blade guide and the other of the front and rear inserts is provided so as to be movable in the cross direction, when the work is cut with the band saw blade and then the band saw blade returns to the initial position, the work is moved backwards by the sending vise and the rear insert is moved backwards relative to the front insert, thereby opening the rear insert. Due to the twist return force of the band saw blade, the saw blade is inclined so that the blade edge of the band saw blade can be removed from the both cut faces and the band saw blade can be returned to the initial position. Therefore, there is no need to provide any dedicated structure such as moving structure of the main unit vise and the removing structure of the band saw blade so as not to bring the work into contact against the band saw blade.

In a saw blade driving method according to a nineteenth aspect of the present invention depending from the eighteenth aspect, the scope of the movement of the other of the front insert and the rear insert in the cross direction is set as a scope in which the edge of the moving band saw blade is allowed to separate from the cut face of the work.

Therefore, in the band saw machine according to the nineteenth aspect of the present invention, since the scope of the movement of the other of the front insert and the rear insert in the cross direction is set as a scope in which the edge of the moving band saw blade is allowed to separate from the cut face of the work, the other of the front insert and the rear insert need not be further moved backwards.

According to a twentieth aspect of the present invention, a cutting method using a band saw machine which includes a main unit vise for cramping a work in the rear of a cutting position where the work is cut with a band saw blade and a sending vise that is movable in the cross direction for sending the work; a saw blade housing having a driving wheel and a driven wheel around which the band saw blade is wound; and a pair of saw blade guides for bending the band saw blade in the saw blade housing and guiding the band saw blade, the method includes the steps of: cutting the work with the band saw blade and then moving the sending vise backwards, thereby relieving the work backwards from the cutting position; moving the rear insert backwards relative to the front insert provided at the front end of the saw blade guide to open the rear insert; and returning the band saw blade to the initial position.

Therefore, in the cutting method according to the twentieth aspect of the present invention, when the work is cut with the band saw blade and then the band saw blade returns to the initial position, the work is moved backwards by the sending vise and the rear insert is moved backwards relative to the front insert, thereby opening the rear insert. Due to the twist return force of the band saw blade, the saw blade is inclined so that the blade edge of the band saw blade can be removed from the both cut faces and the band saw blade can be returned to the initial position. Therefore, there is no need to provide any dedicated structure such as moving structure of the main unit vise and the removing structure of the band saw blade so as not to bring the work into contact against the band saw blade.

In the cutting method according to a twenty-first aspect of the present invention depending from the twentieth aspect, the scope of the movement of the rear insert in the cross direction is a scope in which the edge of the moving band saw blade is allowed to separate from the cut face of the work.

Therefore, in the cutting method according to the twenty-first aspect of the present invention depending from the twentieth aspect, since the scope of the movement of the rear insert in the cross direction is a scope in which the edge of the moving band saw blade is allowed to separate from the cut face of the work, the rear insert need not be further moved backwards.

BRIEF DESCRIPTION OF DRAWINGS

FIG. 23(A) is a plan view showing the state where a work is sent by a sending vise and the work held by a main unit vise is cut with the band saw blade and FIG. 23(B) is a side view of FIG. 23(A).

FIG. 24(A) is a plan view showing the state where the work is cut and then the band saw blade returns to an original position and FIG. 24(B) is a side view of FIG. 24(A).

FIG. 25(A) is a plan view showing the state where the work is held between the front vise and the rear vise and cut and FIG. 25(B) is a plan view showing the state where the work is moved with the front vise and the rear vise after cutting.

BEST MODE FOR CARRYING OUT THE INVENTION

Hereinafter, embodiments of the present invention will be described with reference to drawings.

Figure 1:
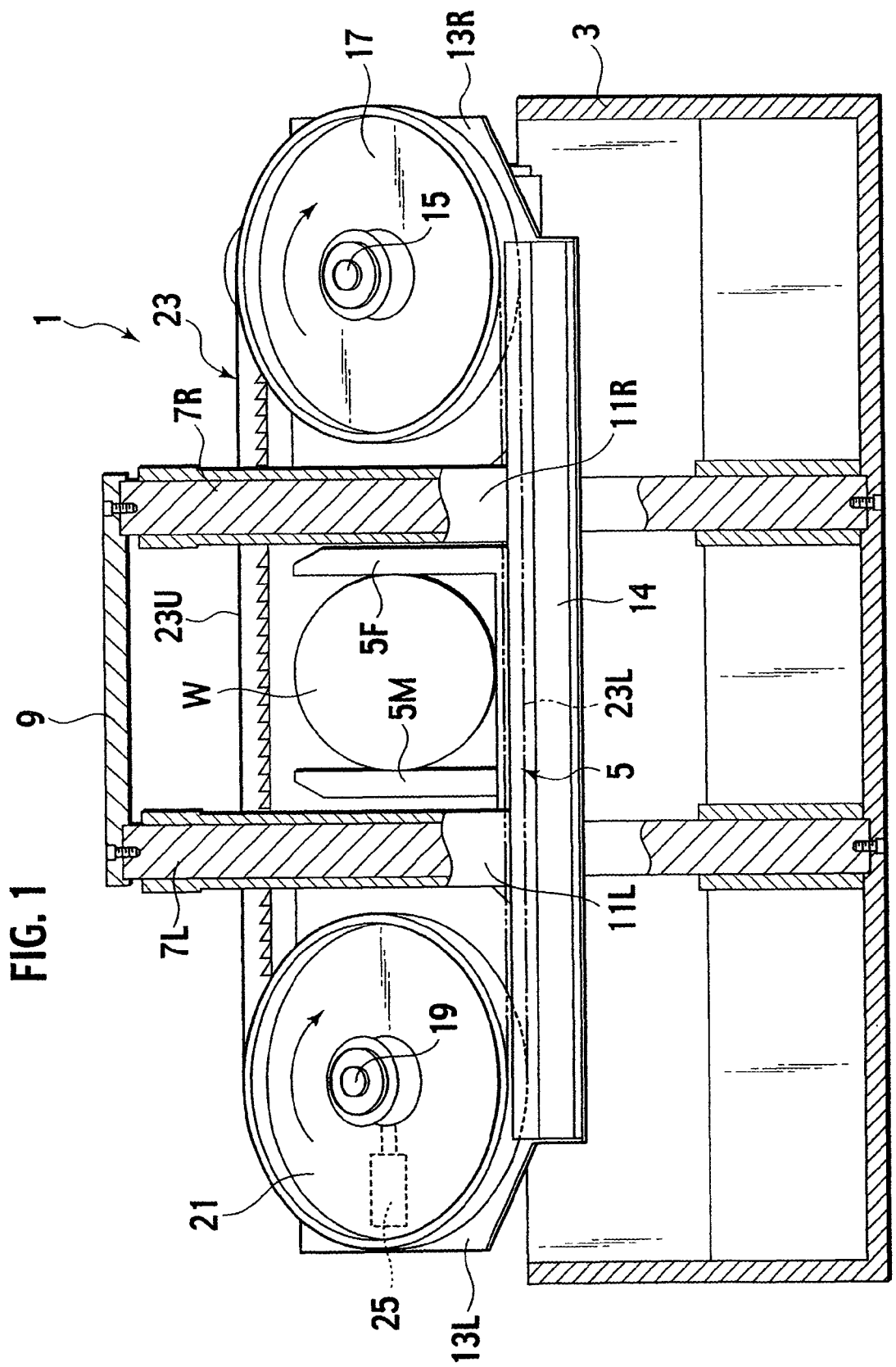
FIG. 1 is a conceptual and schematic front explanation view of a horizontal band saw machine in accordance with an embodiment of the present invention.

FIG. 1 shows a band saw machine in accordance with a first embodiment of the present invention, in particular, a horizontal band saw machine 1. The horizontal band saw machine 1 is provided with a box-like base frame 3 and a vise device 5 having a fixed vise jaw 5F and a movable vise jaw 5M on the upper face of the base frame 3, which can fixedly hold a work W therebetween and are located opposite to each other. Since the configuration of the vise device 5 is general and publicly known, detailed description of the vise device 5 is omitted.

Hereinafter, when describing the horizontal band saw machine 1, a direction in which a work W moves with respect to the horizontal band saw machine 1 is defined as an X-axis direction, a direction perpendicular to the X-axis direction in which the saw blade runs is defined as a Y-axis direction, a direction in which the work W advances to be cut in the X-axis direction is defined as a forward direction (represented by "F" in FIG. 21 and FIG. 27) and a direction in which the cut work W retreats is defined as a rearward direction (represented by "R" in FIG. 21 and FIG. 27).

A pair of left and right guide posts 7L, 7R are vertically installed on the base frame 3 and upper ends of the guide posts 7L, 7R are integrally coupled to each other with a coupling member 9 to improve strength and maintain parallellization of the guide posts 7L, 7R. Cylindrical slide sleeves 11L, 11R are fitted into the left and right guide posts 7L, 7R so as to freely move in the vertical direction and left and right wheel brackets 13L, 13R are integrally fixed to left and right outer sides of the left and right slide sleeves 11L, 11R, respectively, by welding or the like.

The left and right wheel brackets 13L, 13R are inclined so that the upper sides may become the rear sides (the upper sides may become the back face sides in FIG. 1). The lower sides of the slide sleeves 11L, 11R and the lower parts of the left and right wheel brackets 13L, 13R are integrally coupled to a horizontally long beam member 14. The beam member 14 and the left and right wheel brackets 13L, 13R form a saw blade housing for rotatably supporting a driving wheel and a driven wheel described later. When the saw blade housing is raised, the housing has the appearance of a C shape configuration and is limited in height.

Figure 2:
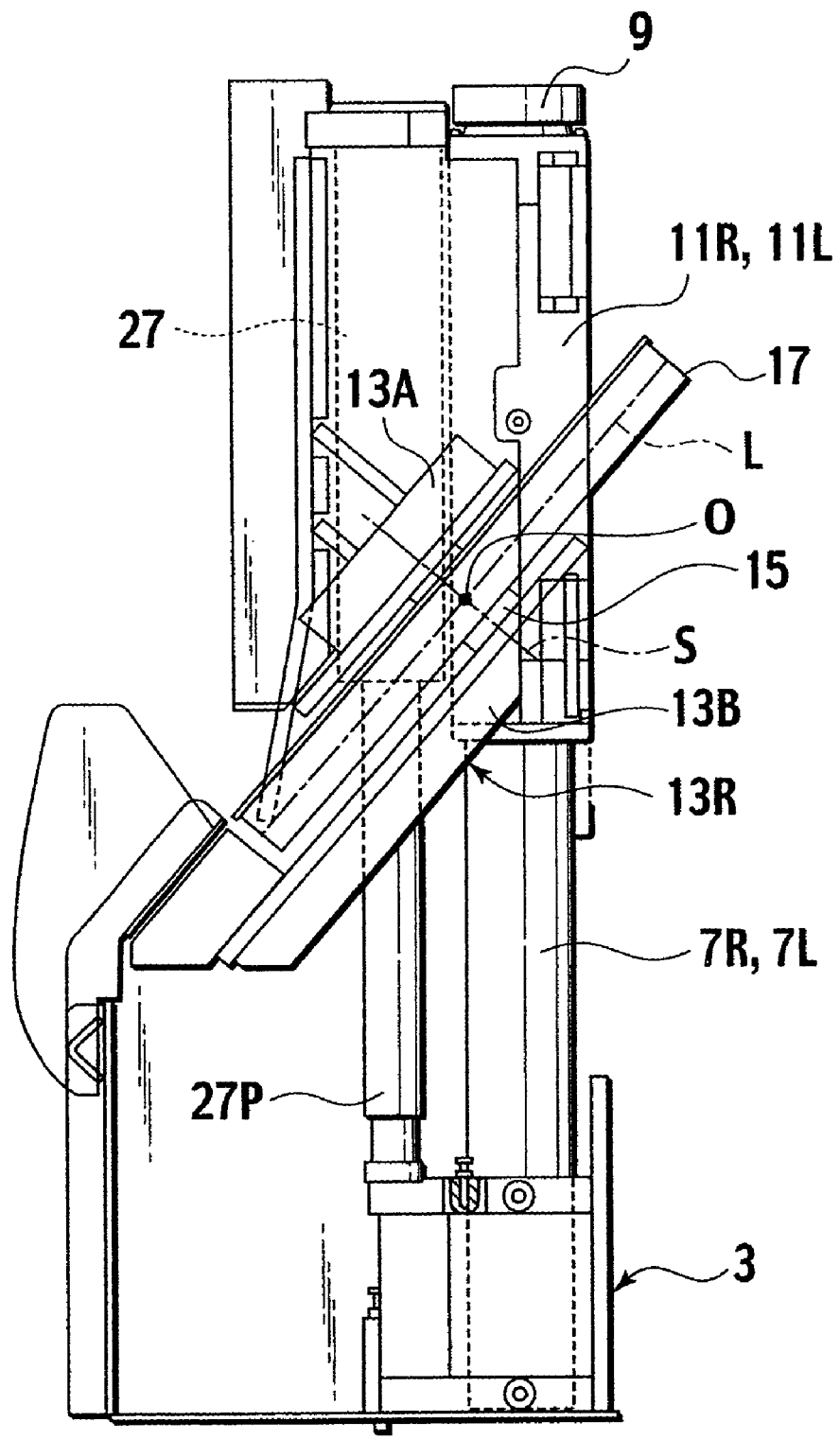
FIG. 2 is a side explanation view showing positional relationship between a driving wheel, a driven wheel and guide posts when viewed from the side.

The wheel brackets 13R, as shown in FIG. 2, has a double structure with an upper bracket 13A and a lower bracket 13B and the driving wheel 17 is rotatably supported between the upper and lower brackets 13A, 13B with a rotational shaft 15 supported by the upper and lower brackets 13A, 13B at its both ends. The driving wheel 17 is rotationally driven by a motor (not shown) attached to the wheel bracket 13R.

The driven wheel 21 is rotatably supported by the left wheel bracket 13L with a rotational shaft 19 and an endless band saw blade 23 is hung around the driven wheel 21 and the driving wheel 17. A tension applying means 25 for moving the driven wheel 21 in the direction of approaching to or separating from the driving wheel 17 and applying tension to the band saw blade 23 is attached to the wheel brackets 13L.

The tension applying means 25 applies tension to the band saw blade 23 by moving a supporting block (not shown) supporting the rotational shaft 19 in the direction of approaching to or separating from the driving wheel 17 and is formed of a hydraulic cylinder or a screw mechanism, for example. Since this type of tension applying means 25 is publicly known, more detailed description of the tension applying means 25 is omitted.

To move the saw blade housing in the vertical direction, a vertically movable actuator 27 such as a hydraulic cylinder (refer to FIG. 2) is provided and a piston rod 27P of the vertically movable actuator 27 is coupled to a part of the base frame 3 so that the cylinder main unit may be integrally coupled to the slide sleeves 11R (Details of the coupling structure are not shown). The actuator vertically moving in the saw blade housing is not limited to the hydraulic cylinder and, for example, a ball screw mechanism rotated by a motor can be adopted.

As shown in FIG. 2, when viewed from both sides in the horizontal direction, the driving wheel 17 and the driven wheel 21 are inclined so that the upper parts of the driving wheel 17 and the driven wheel 21 are located in the rear of the guide posts 7L, 7R (right side in FIG. 2) and the lower parts of the driving wheel 17 and the driven wheel 21 are located in front of the guide posts 7L, 7R (left side in FIG. 2).

In a side view, intersection points O of shaft centers S of the driving wheel 17 and the driven wheel 21 with center lines L of the wheels 17, 21 in the width direction are located at positions almost equal to the width of the guide posts 7L, 7R in the cross direction or within the width.

Thus, a straight upper traveling part 23U of the band saw blade 23 hung around the driving wheel 17 and the driven wheel 21 is located in the rear of the pair of guide posts 7L, 7R and a straight lower traveling part 23L of the band saw blade 23 is located in front of the guide posts 7L, 7R. To cut the work W with the upper traveling part 23U, the saw blade housing is provided with a saw blade guide (not shown) for bending the edge of the saw blade of the upper traveling part 23U so as to be vertically oriented in the downward direction. The lower traveling part 23L of the band saw blade 23 is located below a work supporting face of the vise device 5 even when the saw blade housing rises to the highest position.

Furthermore, to push minute clearances between the guide posts 7L, 7R and the slide sleeves 11L, 11R, respectively, in one direction, that is, to make clearances in the rear of the guide posts 7L, 7R (right side in FIG. 2) in the upper sides of the slide sleeves 11L, 11R and clearances in front of the guide posts 7L, 7R (left side in FIG. 2) in the lower sides of the slide sleeves 11L, 11R zero, the center of gravity of the saw blade housing is provided at the forward side (inclined lower side) of the saw blade housing.

With the above-mentioned configuration, by rotationally driving the driving wheel 17 and lowering the saw blade housing, the work W fixedly held by the vise device 5 can be cut with the upper traveling part 23U of the band saw blade 23.

In cutting the work W as described above, when the driven wheel 21 is moved by the tension applying means 25 in the direction of separating from the driving wheel 17, thereby applying a large tension to the band saw blade 23, the left and right guide posts 7L, 7R receive the reaction force via the left and right wheel brackets 13L, 13R and the left and right slide sleeves 11L, 11R.

Accordingly, it is possible to make the tension of the band saw blade 23 much larger than that in the conventional configuration, to control bending at the high-speed heavy cutting and to perform heavy cutting with high accuracy and efficiency. In other words, with this configuration, the tensile stiffness can be improved while simplifying and lightening the saw blade housing supporting the driving wheel 17 and the driven wheel 21.

Since the upper traveling part 23U of the band saw blade 23 is located in the rear of the guide posts 7L, 7R and the lower traveling part 23L of the band saw blade 23 is located in front of the guide posts 7L, 7R, the size of the whole configuration including the guide posts 7L, 7R in the cross direction can be reduced, thereby achieving miniaturization. Furthermore, the driving wheel 17 and the driven wheel 21 are located outside of the left and right guide posts 7L, 7R in the horizontal direction, it is possible to control vibration during the cutting of the work W, extend the life of the band saw blade 23 and improve the accuracy of the cutting plane, compared with the conventional configuration in which the driving wheel 17 and the driven wheel 21 protrude from the guide posts 7L, 7R.

Since the center of gravity of the saw blade housing is provided at the forward side of the saw blade housing, clearances between the upper rear sides of the guide posts 7L, 7R and the upper rear sides of the slide sleeves 11L, 11R, respectively, are kept at nearly zero clearance. Thus, when the upper traveling part 23U of the band saw blade 23 contacts against the work W and starts the cutting of the work W, the slide sleeves 11L, 11R can smoothly slide with respect to the guide posts 7L, 7R in the vertical direction without causing any shock or the like due to the existence of the clearances between the guide posts 7L, 7R and the slide sleeves 11L, 11R, respectively.

Figure 28:
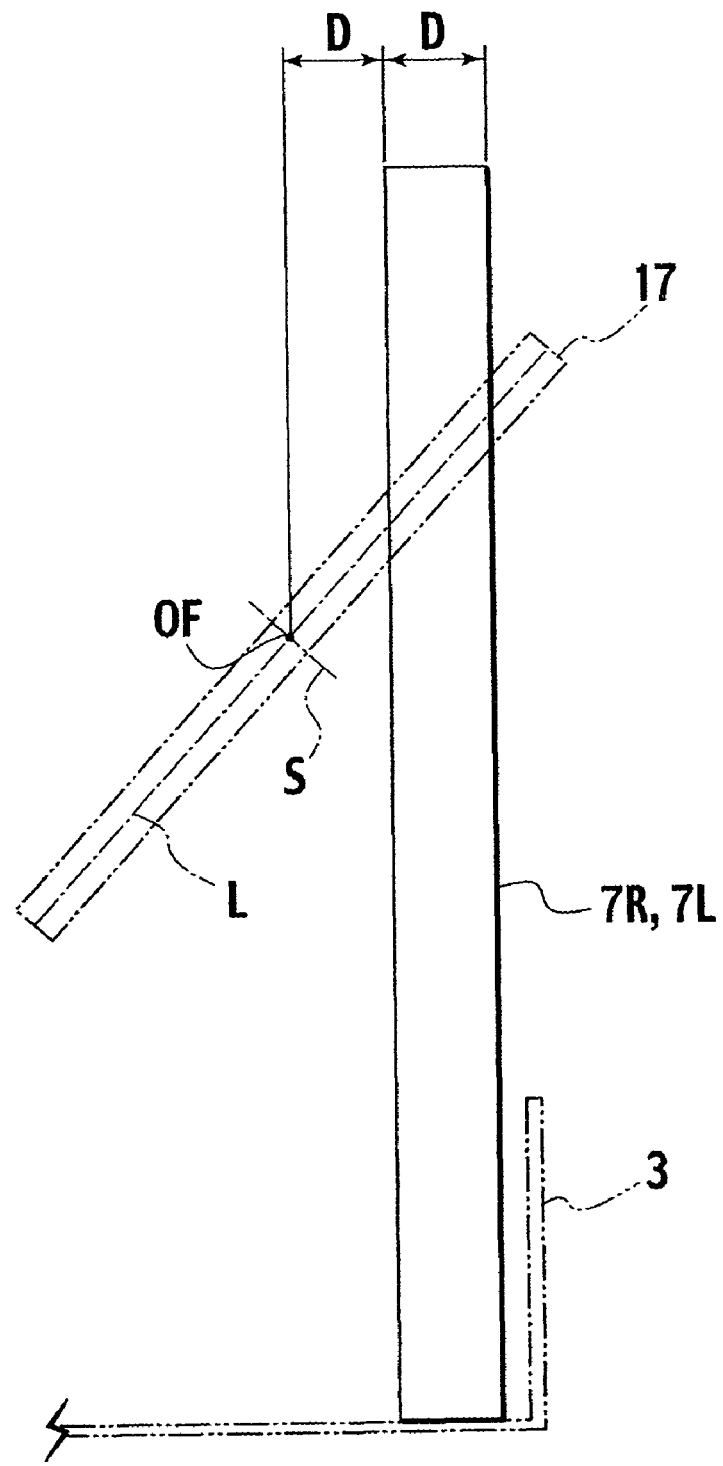
FIG. 28 is a side view for explaining a mode in which positional relationship between the guide posts and the saw blade is partially modified.
Figure 29:
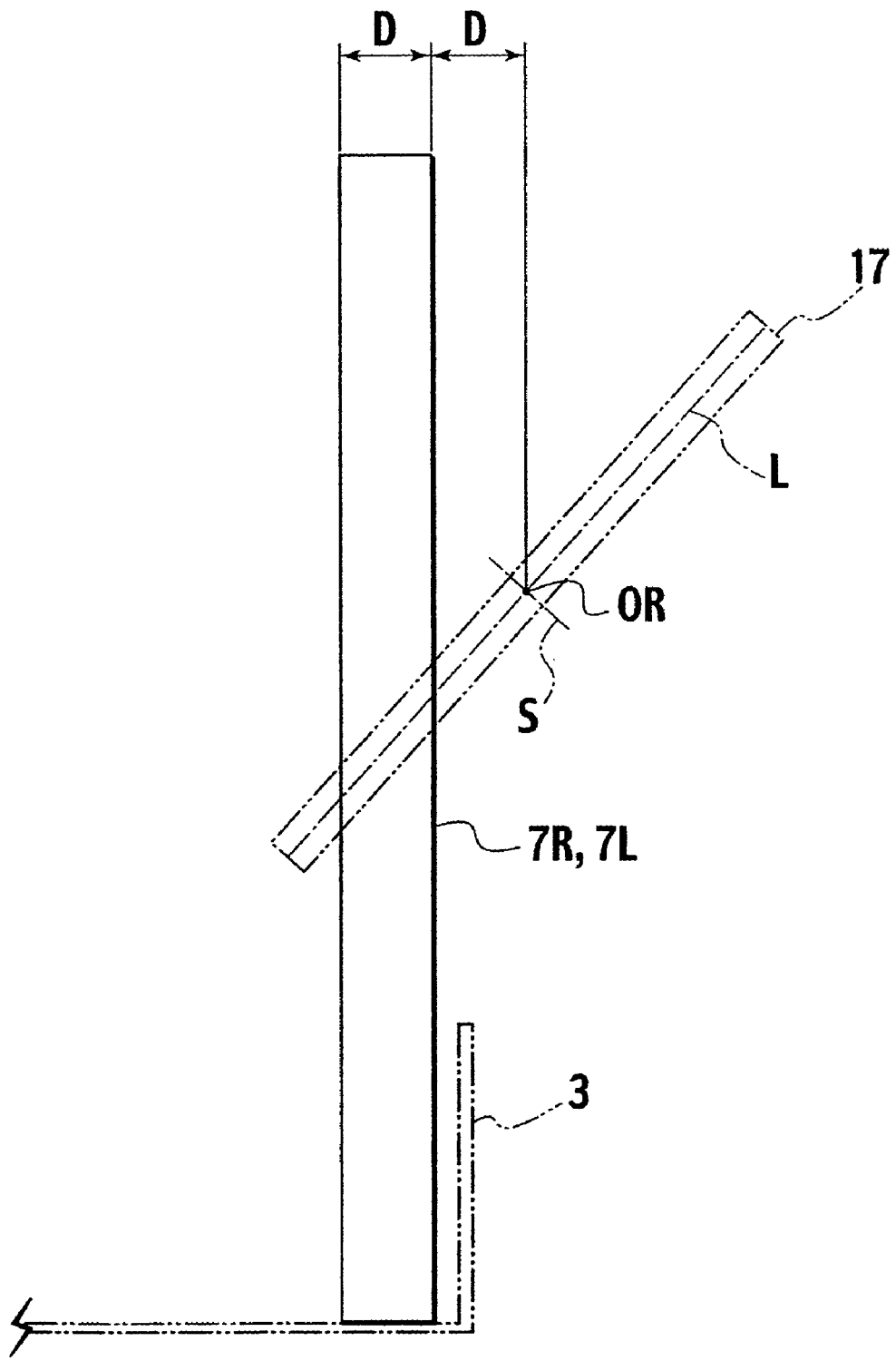
FIG. 29 is a side view for explaining a mode in which positional relationship between the guide posts and the saw blade is partially modified.

As shown in FIG. 2, in the side view, it is desired that the intersection point O is located at the position almost equal to a width D of the guide posts 7L, 7R in the cross direction or within the width D. However, in terms of design, the intersection point O may be located slightly beyond the width of the guide posts 7L, 7R in the cross direction. In this case, a large deviation is undesirable and as shown in FIG. 28 and FIG. 29, it is desired to control within twice as large as the width D of the guide posts 7L, 7R in the cross direction.

Next, a second embodiment of the present invention will be described with reference to figures.

FIG. 3 to FIG. 7 show a double-post horizontal band saw machine 1 having a band saw blade attachment auxiliary device according to the present invention. The horizontal band saw machine 1 is provided with the box-like base frame 3, a cut material carrying table 4 for carrying a cut material W to the horizontal band saw machine 1 which is disposed on the upper face of the base frame 3 and in the rear side of the horizontal band saw machine 1 (back face side of the sheet of FIG. 3, left side in FIG. 5) and a product receiving table 6 for supporting the product W cut in the horizontal band saw machine 1 which is disposed on the upper face of the base frame 3 and in the front side of the horizontal band saw machine 1 (front face side of the sheet of FIG. 3, right side in FIG. 5).

The cut material carrying table 4 is provided with the vise device 5 (5F, 5M) having the fixed vise jaw 5F and the movable vise jaw 5M that can fixedly hold a work W therebetween and are located opposite to each other. Since the configuration of the vise device 5 (5F, 5M) is general and publicly known, detailed description thereof is omitted.

A pair of left and right guide posts 7L, 7R are vertically installed on the base frame 3 and the upper ends of the guide posts 7L, 7R are integrally coupled to each other with the coupling member 9 to improve strength and maintain parallelization of the guide posts 7L, 7R.

The cylindrical slide sleeves 11L, 11R are fitted into the left and right guide posts 7L, 7R so as to freely move in the vertical direction and the left and right wheel brackets 13L, 13R are integrally fixed to the left and right outer sides of the left and right slide sleeves 11L, 11R, respectively, by welding or the like.

Figure 3:
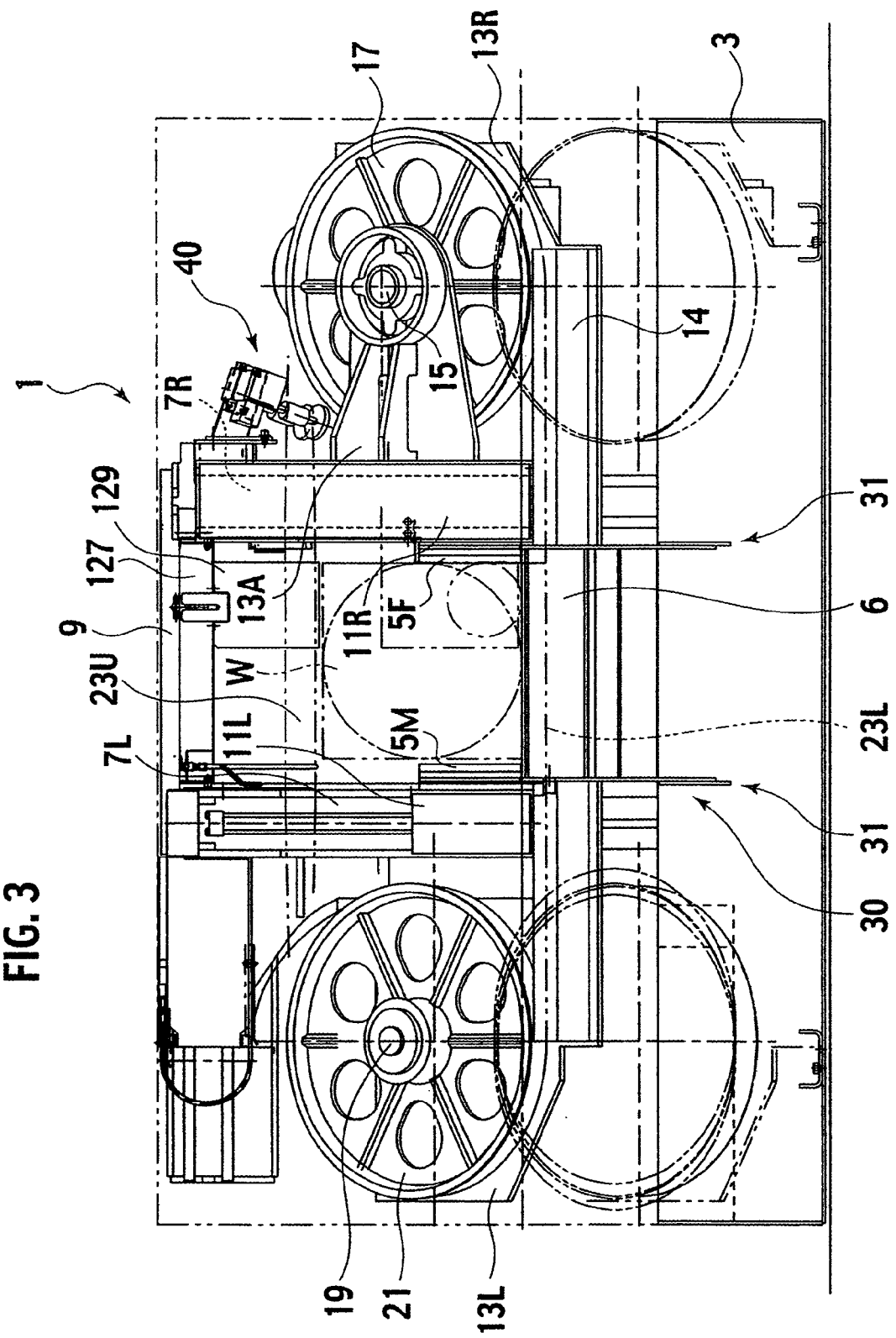
FIG. 3 is an side explanation view of a double-post horizontal band saw machine having a band saw blade attachment auxiliary device in accordance with the embodiment of the present invention.
Figure 4:
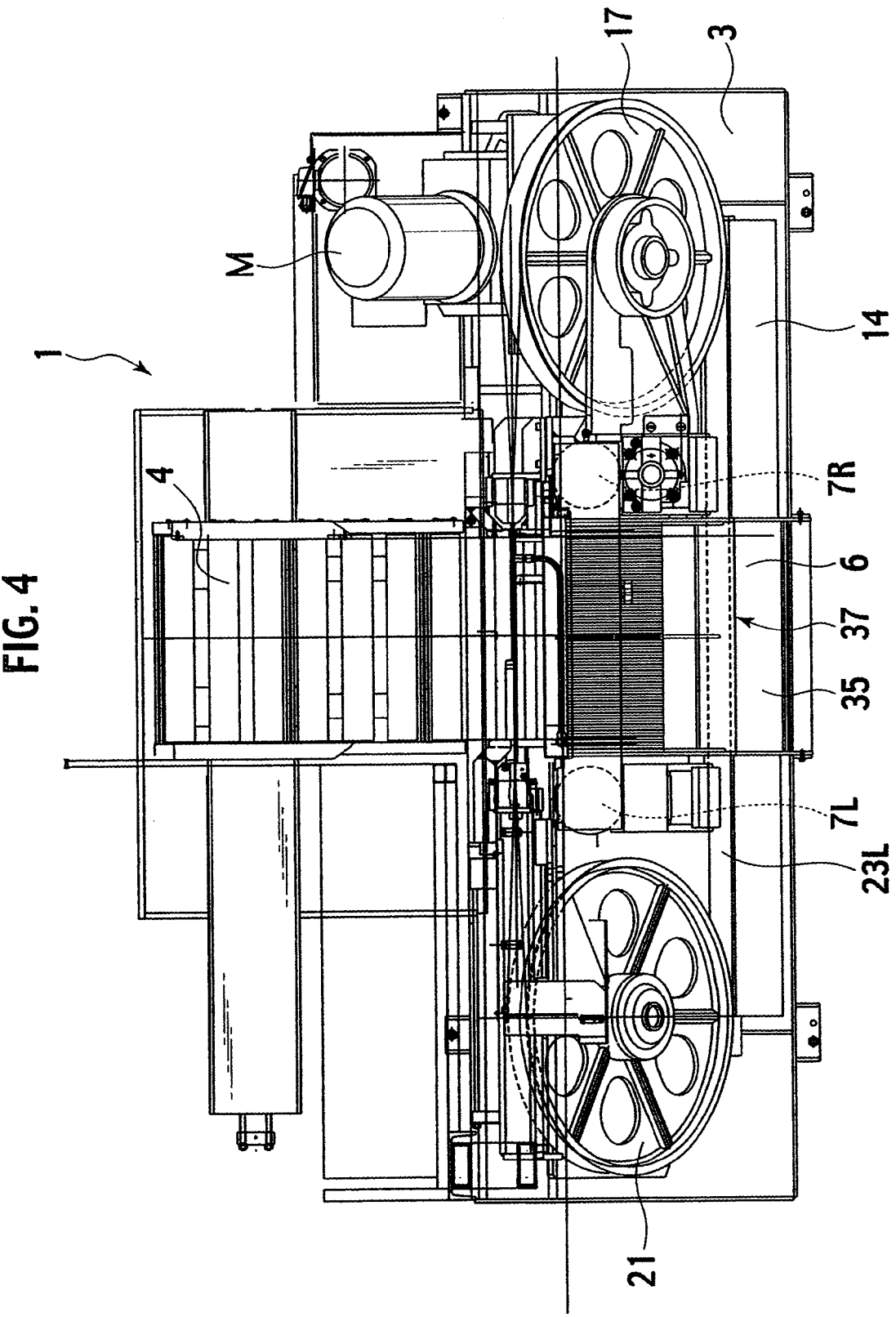
FIG. 4 is a front explanation view of FIG. 3.

The left and right wheel brackets 13L, 13R are inclined so that the upper sides may become the rear sides (the upper sides may become the back face sides in FIG. 3). The lower sides of the slide sleeves 11L, 11R and the lower parts of the left and right wheel brackets 13L, 13R are integrally coupled to the horizontally long beam member 14.

The beam member 14 and the left and right wheel brackets 13L, 13R form a saw blade housing for rotatably supporting a driving wheel and a driven wheel described later so as to be opened to the upside in the shape of C and limit the height.

Figure 6:
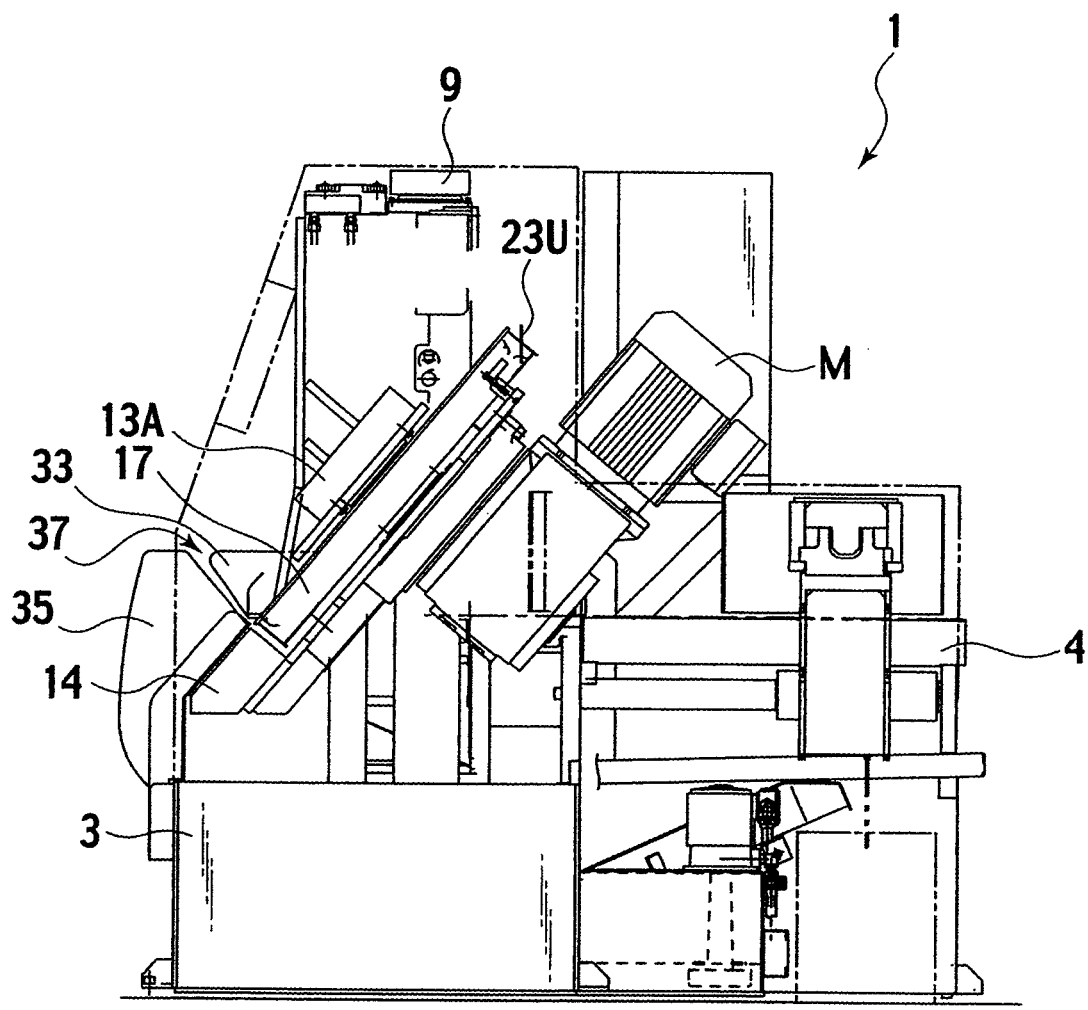
FIG. 6 is a right side explanation view of FIG. 3.

The wheel brackets 13R, as shown in FIG. 6, has a double structure with the upper bracket 13A and the lower bracket 13B and the driving wheel 17 is rotatably supported between the upper and lower brackets 13A, 13B with a rotational shaft 15 supported by the upper and lower brackets 13A, 13B at its both ends.

The driving wheel 17 is rotationally driven by a motor M (refer to FIGS. 4, 6 and 7) attached to the wheel bracket 13R.

The driven wheel 21 is rotatably supported by the left wheel bracket 13L with a rotational shaft 19 and the band saw blade 23 is hung around the driven wheel 21 and the driving wheel 17. A tension applying means (not shown) for moving the driven wheel 21 in the direction of approaching to or separating from the driving wheel 17 and applying tension to the band saw blade 23 is attached to the wheel brackets 13L.

The tension applying means (not shown) applies tension to the band saw blade 23 by moving a supporting block (not shown) supporting the rotational shaft 19 in the direction of approaching to or separating from the driving wheel 17 and is formed of a hydraulic cylinder or a screw mechanism, for example. Since this type of tension applying means 25 is publicly known, more detailed description of the tension applying means 25 is omitted. To vertically move the saw blade housing, a vertically movable actuator (not shown) such as a hydraulic cylinder is provided.

Figure 5:
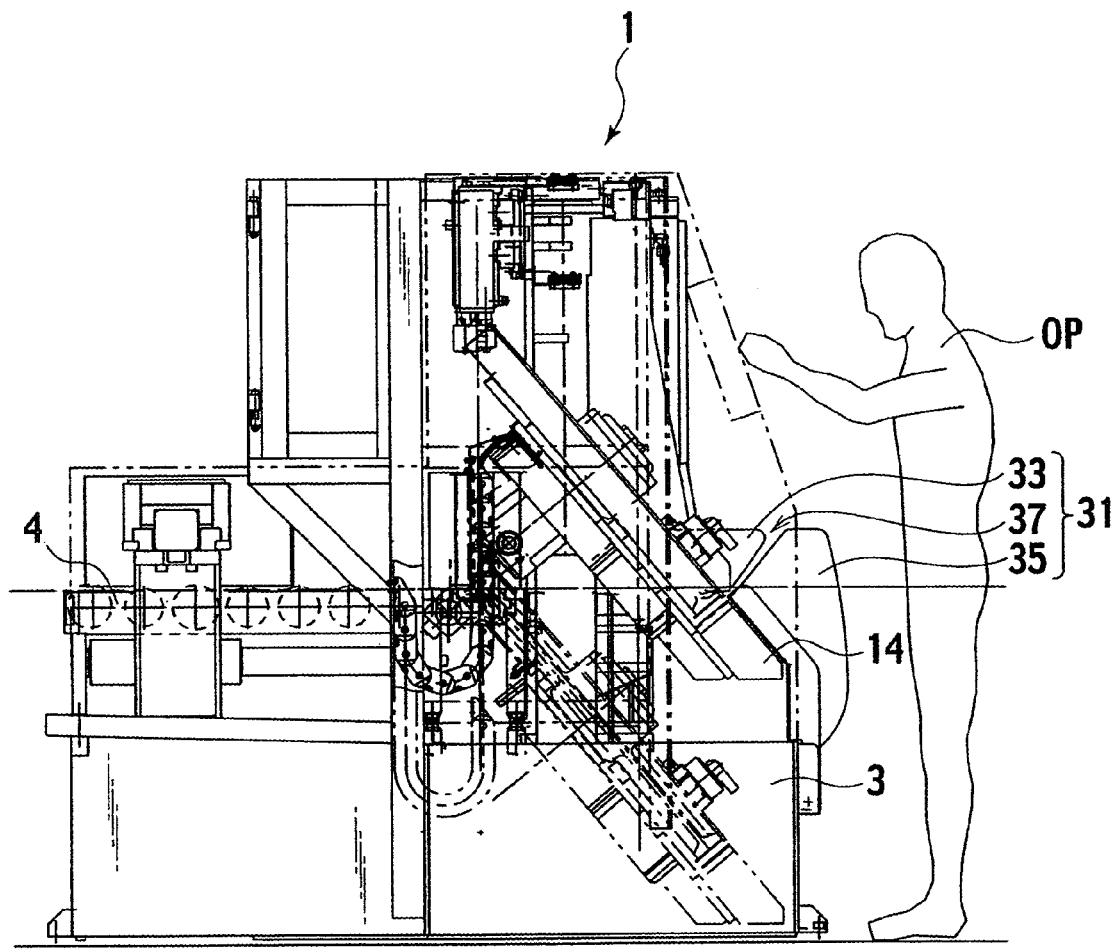
FIG. 5 is a left side explanation view of FIG. 3.

As shown in FIG. 5 and FIG. 6, when viewed from left and right sides in the horizontal direction, the driving wheel 17 and the driven wheel 21 are inclined so that the upper parts of the driving wheel 17 and the driven wheel 21 are located in the rear of the guide posts 7L, 7R (right side in FIG. 2) and the lower parts of the driving wheel 17 and the driven wheel 21 are located in front of the guide posts 7L, 7R (left side in FIG. 2).

The upper traveling part 23U of the band saw blade 23 hung around the driving wheel 17 and the driven wheel 21 is located in the rear of the pair of guide posts 7L, 7R and the lower traveling part 23L of the band saw blade 23 is located in front of the guide posts 7L, 7R.

Figure 7:
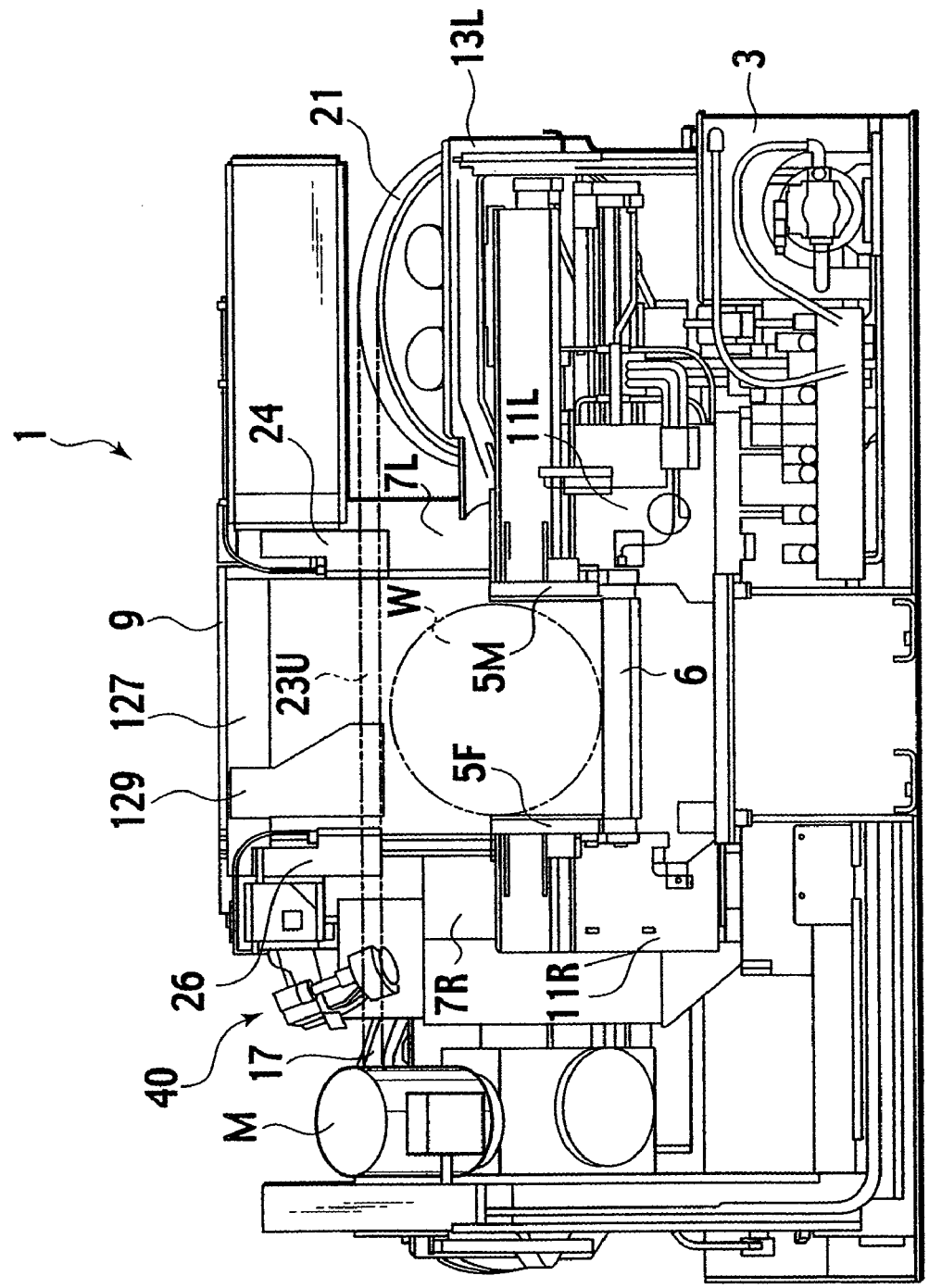
FIG. 7 is a back explanation view of FIG. 3.

To cut the cut material W with the upper traveling part 23U, the saw blade housing is provided with moving saw blade guide 24 (saw blade guide) and a fixed saw blade guide 26 (saw blade guide) for bending the saw blade so that the edge of the saw blade is vertically oriented in the downward direction in the upper traveling part 23U (refer to FIG. 7).

The lower traveling part 23L of the band saw blade 23 is located below a cut material supporting face of the vise device 5 even when the saw blade housing rises to the highest position.

With the above-mentioned configuration, by rotationally driving the driving wheel 17 and lowering the saw blade housing, the work W fixedly held by the vise device 5 can be cut with the upper traveling part 23U of the band saw blade 23.

As shown in FIG. 3 and FIG. 7, a carriage bar 127 that rises or lowers following the vertical movement of the saw blade housing is provided in a space above the upper traveling part 23U of the band saw blade 23 and extends in the horizontal direction and in parallel with the upper traveling part 23U and the carriage bar 127 is provided with a plate-like detector 129 for detecting that the upper traveling part 23U of the band saw blade 23 gets close to the cut material W.

Hereinafter, the band saw blade attachment auxiliary device 30 as a main part of the present invention will be described.

As shown in FIG. 3 to FIG. 6, band saw blade guiding means 31 for guiding a substantially middle region of the lower traveling part 23L of the circular band saw blade 23 to outer peripheries of the driving wheel and the driven wheel when the circular band saw blade is attached to the driving wheel and the driven wheel are provided at both sides of the product receiving table 6 installed on the front side of the horizontal band saw machine 1.

In more detail, in the band saw blade guiding means 31 (band saw blade introducing means), an upper band saw blade guide 33 (upper band saw blade introducing means) is provided at each side of the product receiving table 6 installed on the front side of the horizontal band saw machine 1, a lower band saw blade guide 35 (lower band saw blade introducing means) opposed to the upper band saw blade guide 33 is provide at a base 3 of the horizontal band saw machine 1 and a slit 37 having a slightly larger width than the thickness of the band saw blade so as to let the substantially middle region of the lower traveling part 23L of the circular band saw blade 23 therethrough is formed between the upper band saw blade guide 33 and the lower band saw blade guide 35.

A process for exchanging the band saw blade 23 by the operator OP using a band saw blade exchange auxiliary device in the horizontal band saw machine with the above-mentioned configuration will be described.

Figure 8:
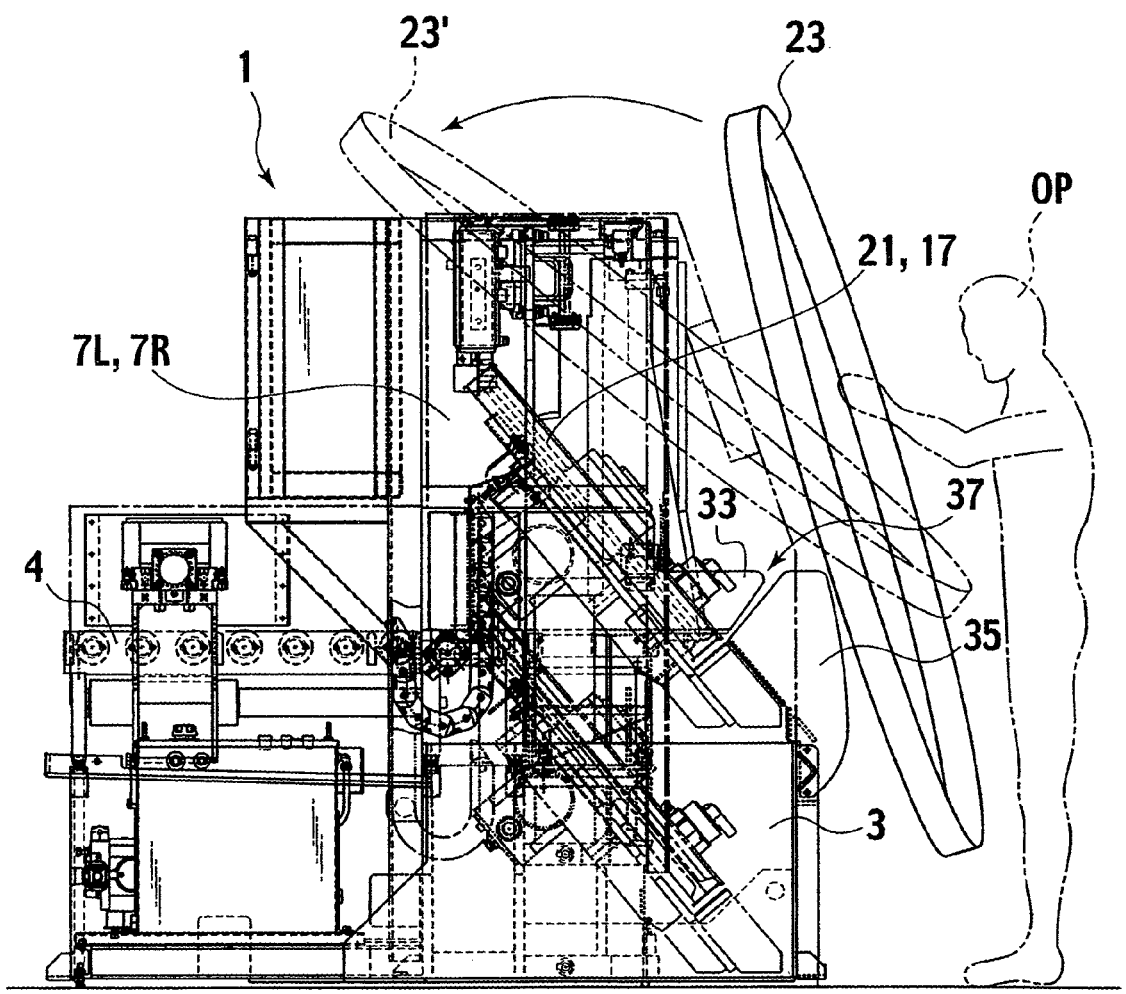
FIG. 8 is a view for explaining the state where the band saw blade is inserted from above the guide posts of the double-post horizontal band saw machine having the band saw blade attachment auxiliary device according to the present invention.
Figure 9:
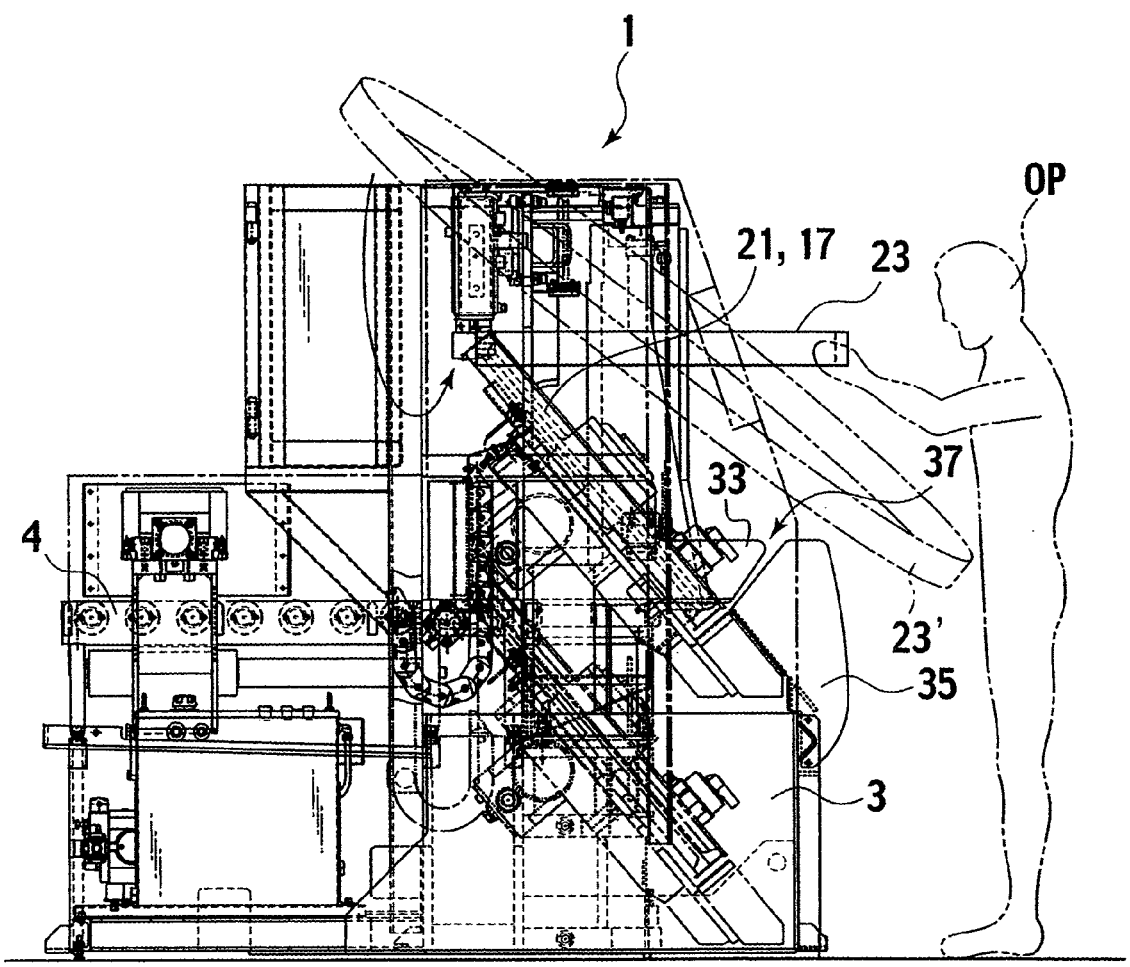
FIG. 9 is a view for explaining the state where an upper traveling part of the band saw blade is inserted into the saw blade guide of the double-post horizontal band saw machine having the band saw blade attachment auxiliary device according to the present invention and fixed thereto.
Figure 10:
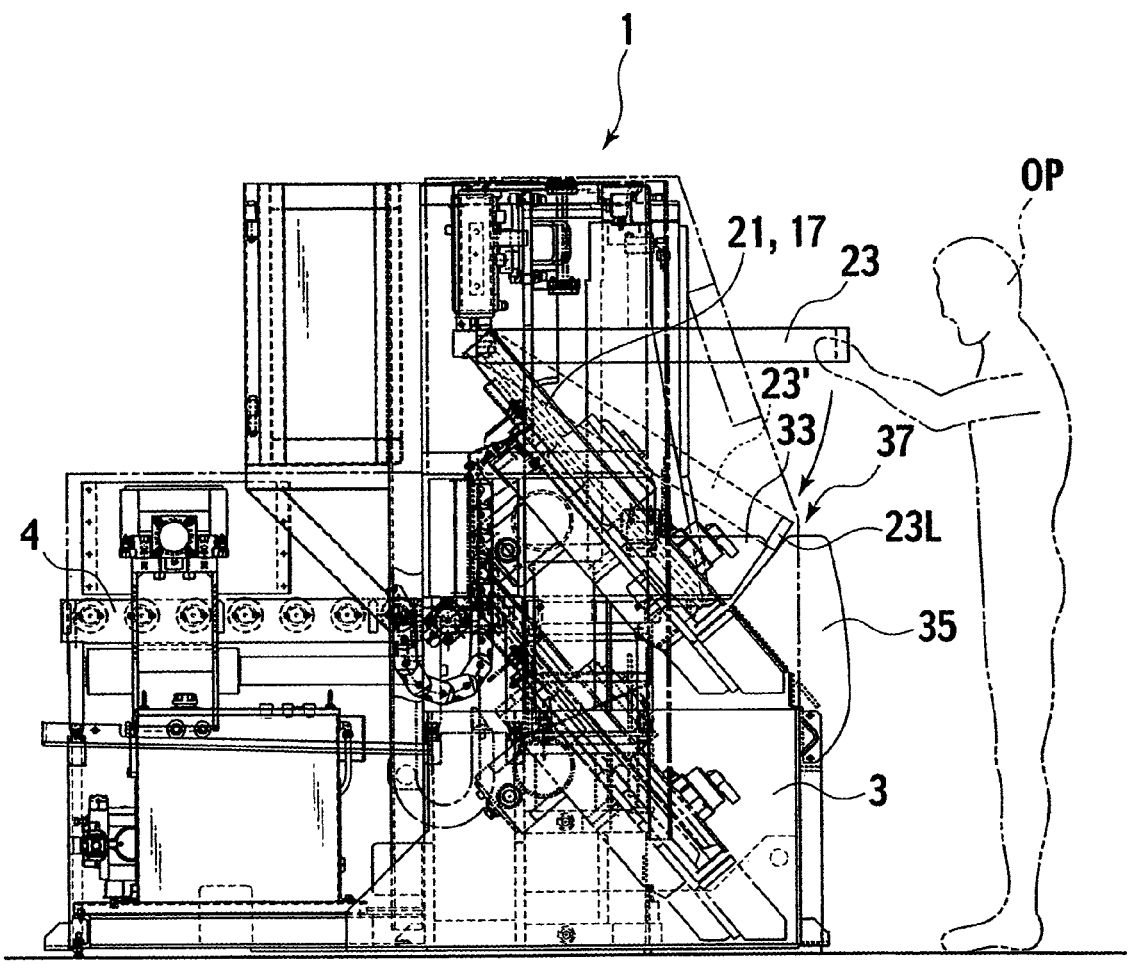
FIG. 10 is a view for explaining the state where the lower traveling part of the band saw blade is attached to outer peripheries of the driving wheel and the driven wheel through a slit of the band saw blade guide of the double-post horizontal band saw machine having the band saw blade attachment auxiliary device according to the present invention.
Figure 11:
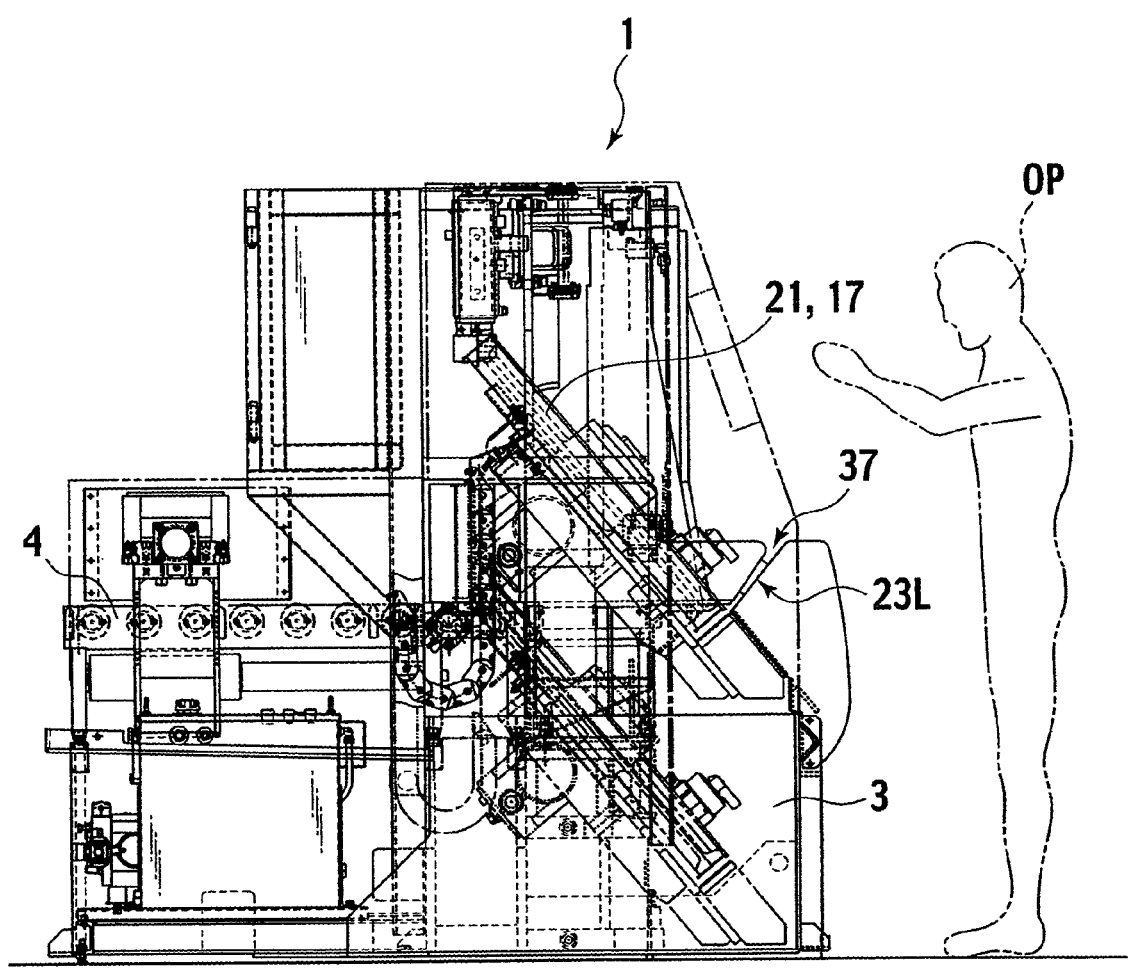
FIG. 11 is a view for explaining the state where the lower traveling part of the band saw blade is attached to outer peripheries of the driving wheel and the driven wheel through a slit of the band saw blade guide of the double-post horizontal band saw machine having the band saw blade attachment auxiliary device according to the present invention.

1. First, adjust the saw blade guides to be located at appropriate interval according to the width of the cut material.
2. Subsequently, insert the circular band saw blade from above the guide posts (refer to FIG. 8).
3. Insert the upper traveling part of the circular band saw blade into and fixed to the saw blade guides (refer to FIG. 9).
4. Insert the lower traveling part of the circular band saw blade into the slit of the band saw blade guides and attach it to the outer peripheries of the driving wheel and the driven wheel (refer to FIG. 10 and FIG. 11).
5. Finally, apply a proper tension to the attached band saw blade by the tension applying means and attachment is finished.

Removal of the band saw blade can be easily performed by carrying out the above-mentioned process in the reverse order.

As mentioned above, use of the band saw blade attachment auxiliary device according to the present invention enables the operator to exchange the band saw blade by himself/herself easily and safely without requiring any special automatic band saw blade exchange device.

That is, since the remaining part other than the upper traveling part of the saw blade is attached to the driving wheel and the driven wheel by being inserted it through the slit of the band saw blade guiding means, the direction of the lower traveling part 23L of the circular band saw blade is fixed and thus, the band saw blade can be attached to the outer peripheries of the driving wheel and the driven wheel.

There is no possibility that, as the direction of the band saw blade is not fixed, the band saw blade contacts against the band saw machine main unit, resulting in damage of the blade and the device main unit.

FIG. 3, FIG. 6 and FIG. 7 show a chip removing device 40 having a wire brush which is rotationally driven, which is represented by a reference numeral 40 in this embodiment and however, as the device is not a main part of the present invention, detailed description thereof is omitted.

Next, a third embodiment of the present invention will be described with reference to figures.

Figure 12:
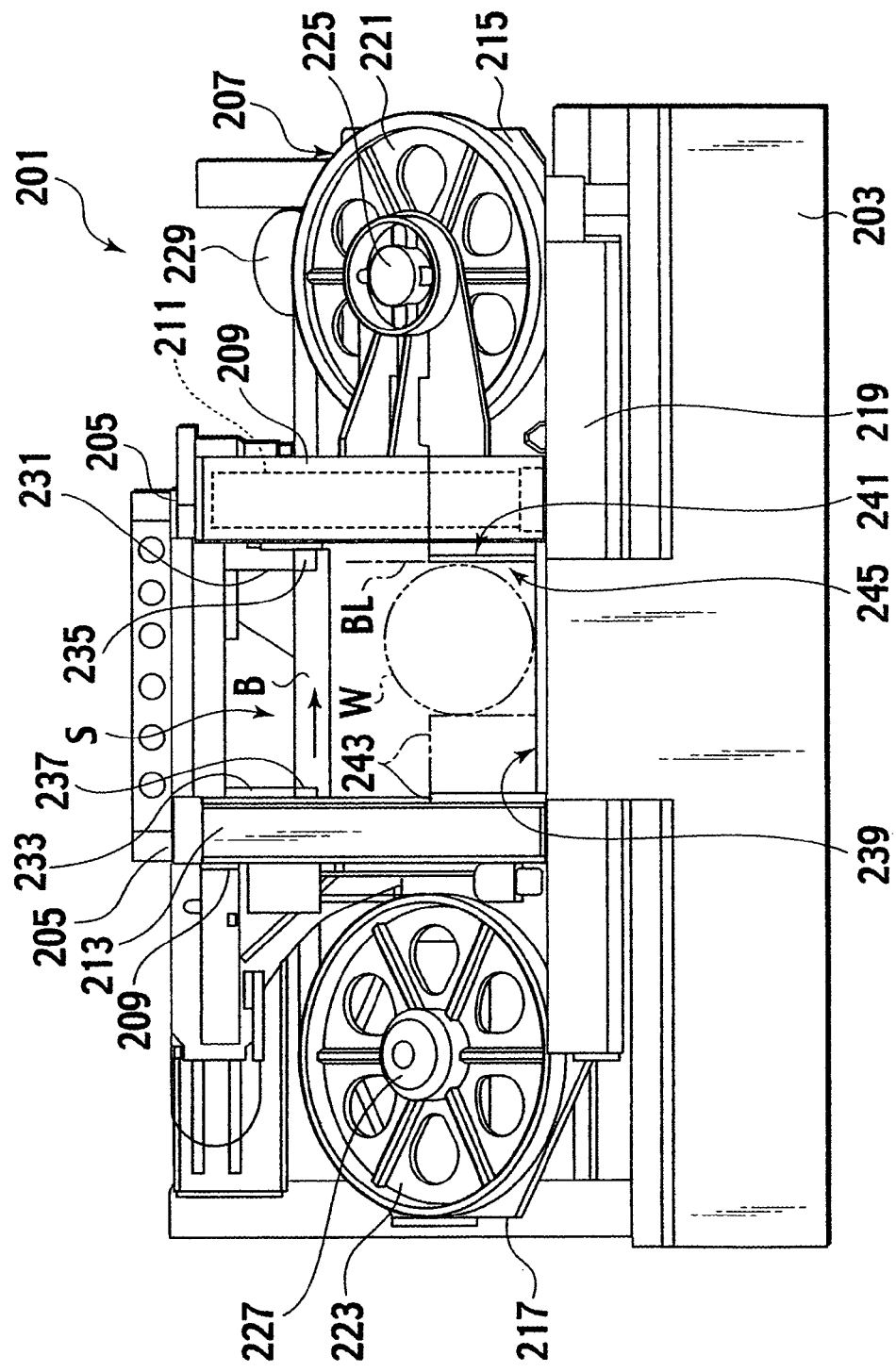
FIG. 12 is a front view of the horizontal band saw machine used in the embodiment of the present invention.
Figure 13:
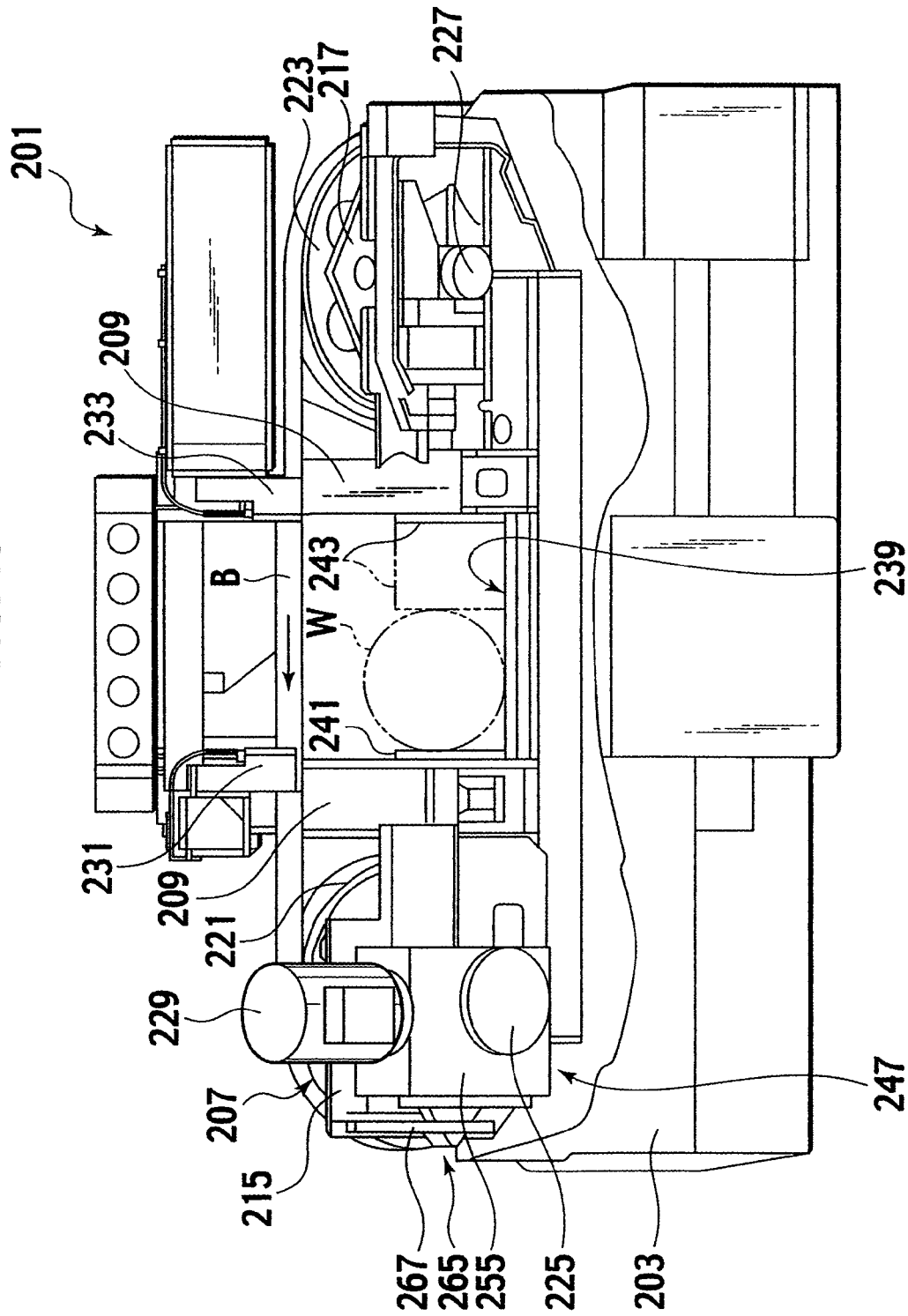
FIG. 13 is a back explanation view of FIG. 12.
Figure 14:
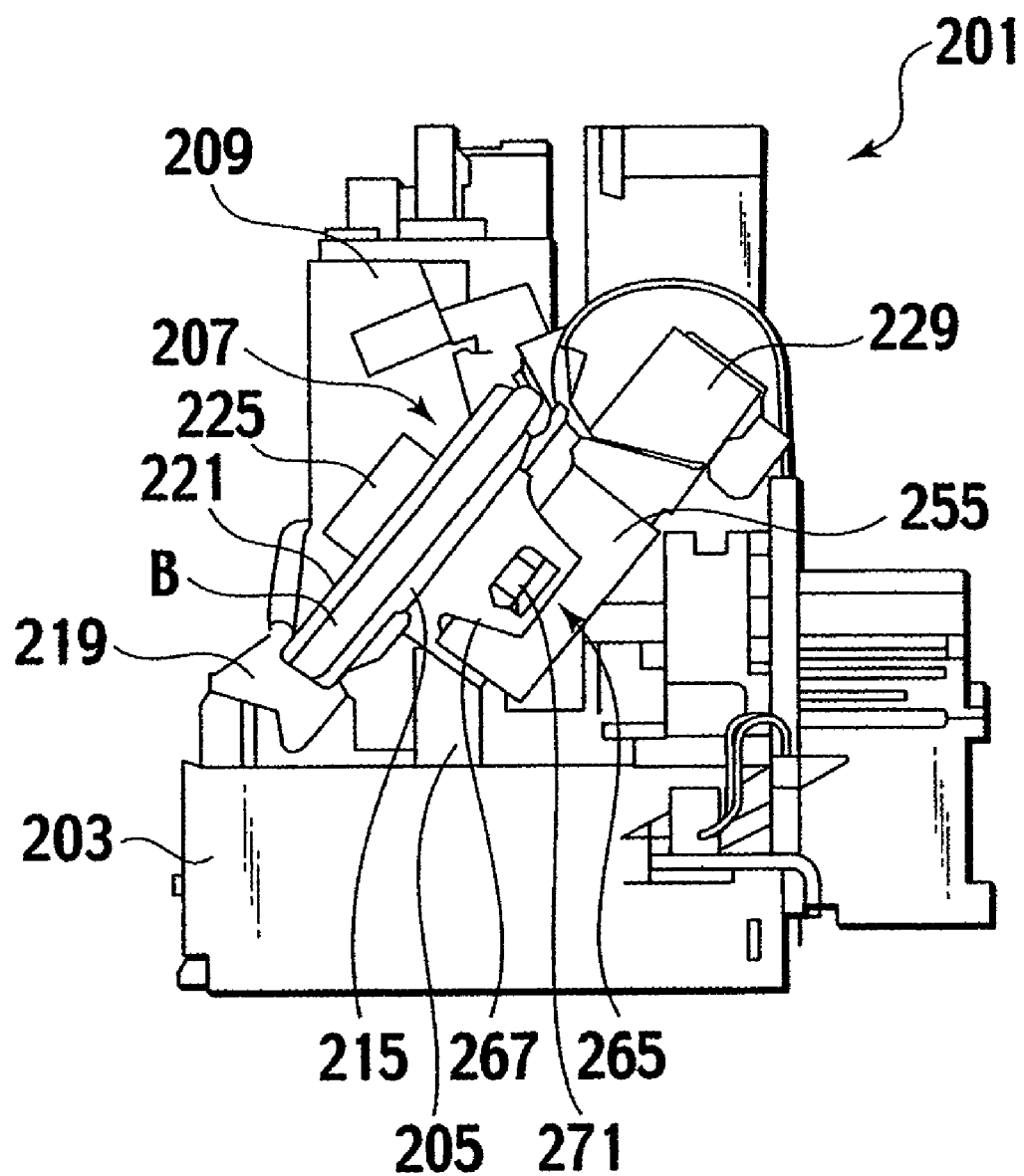
FIG. 14 is a right side explanation view of FIG. 12.

Referring to FIG. 12 to FIG. 14, a horizontal band saw machine 201 as a saw machine in accordance with the third embodiment has a base 203 and left and right guide posts 205 are vertically installed on the base 203 in FIG. 12. A saw blade housing 207 that has a band saw blade B as a cutting tool therein is guided to the guide posts 205 so as to vertically slide using guiding members 209. The vertical movement of the saw blade housing 207 is performed by operating a lifting hydraulic cylinder 211 as a saw blade cutting driving device provided on the base 203. The lifting hydraulic cylinder 211 can control cutting of the work W as a cut material with the band saw blade B and separation of the band saw blade B from the work W.

In FIG. 12, a saw blade position detecting encoder 213 is provided at the left guiding member 209 and the moving speed of the saw blade housing 207, that is, the cutting speed of the band saw blade B is controlled by feed-back of the saw blade position detecting encoder 213.

The saw blade housing 207 is provided with left and right housing parts 215, 217 separated from each other at its both sides and the left and right housing parts 215, 217 are coupled to each other with a beam member not shown. A housing part 219 that let the band saw blade B therethrough is formed along the beam member between the left and right housing parts 215, 217. The guiding members 209 are integrally fixed to the left and right housing parts 215, 217.

The housing parts 215, 217 of the saw blade housing 207 each have a driving wheel 221 and a driven wheel 223 via shafts 225, 227, respectively, and the endless band saw blade B is hung around the driving wheel 221 and the driven wheel 223. The shaft 225 of the driving wheel 221 is linked and coupled to an electric saw blade motor 229, for example. The configuration of a coupled region between the saw blade motor 229 and the shaft 225 of the driving wheel 221 will be described later.

Since driving the saw blade motor 229 rotates the driving wheel 221 through the shaft 225, the band saw blade B hung around the driving wheel 221 and the driven wheel 223 is driven to cut the work W.

A fixed insert 231 (also referred to as "right blade guide") and a moving insert 233 (also referred to as "left blade guide") are attached to the guiding members 209 and in a cutting region S where the band saw blade B cuts the work W, the band saw blade B is guided and supported by backup units 235, 237 provided at front ends of the fixed insert 231 and the moving insert 233, respectively so that the edge of the band saw blade B is vertically oriented in the downward direction. The fixed insert 231 is fixedly attached to the guiding member 209 and the moving insert 233 is attached to the guiding member 209 via a driving means such as a driving cylinder or ball screw so as to be freely positioned according to the size of the work W.

A work table 239 for mounting the work W thereon is provided on the upper face of the base 203 and the work table 239 is provided with a main unit vise device 245 having a reference vise jaw 241 and a movable vise jaw 243 that can fixedly hold a work W therebetween. In more detail, the reference vise jaw 241 is formed on a reference vise line BL in the width direction of the work W and the movable vise jaw 243 is formed to be movable in the direction of approaching to or separating from the reference vise jaw 241.

Next, a saw blade driving device 247 forming a main part of the third embodiment of the present invention will be described referring to figures.

Figure 15:
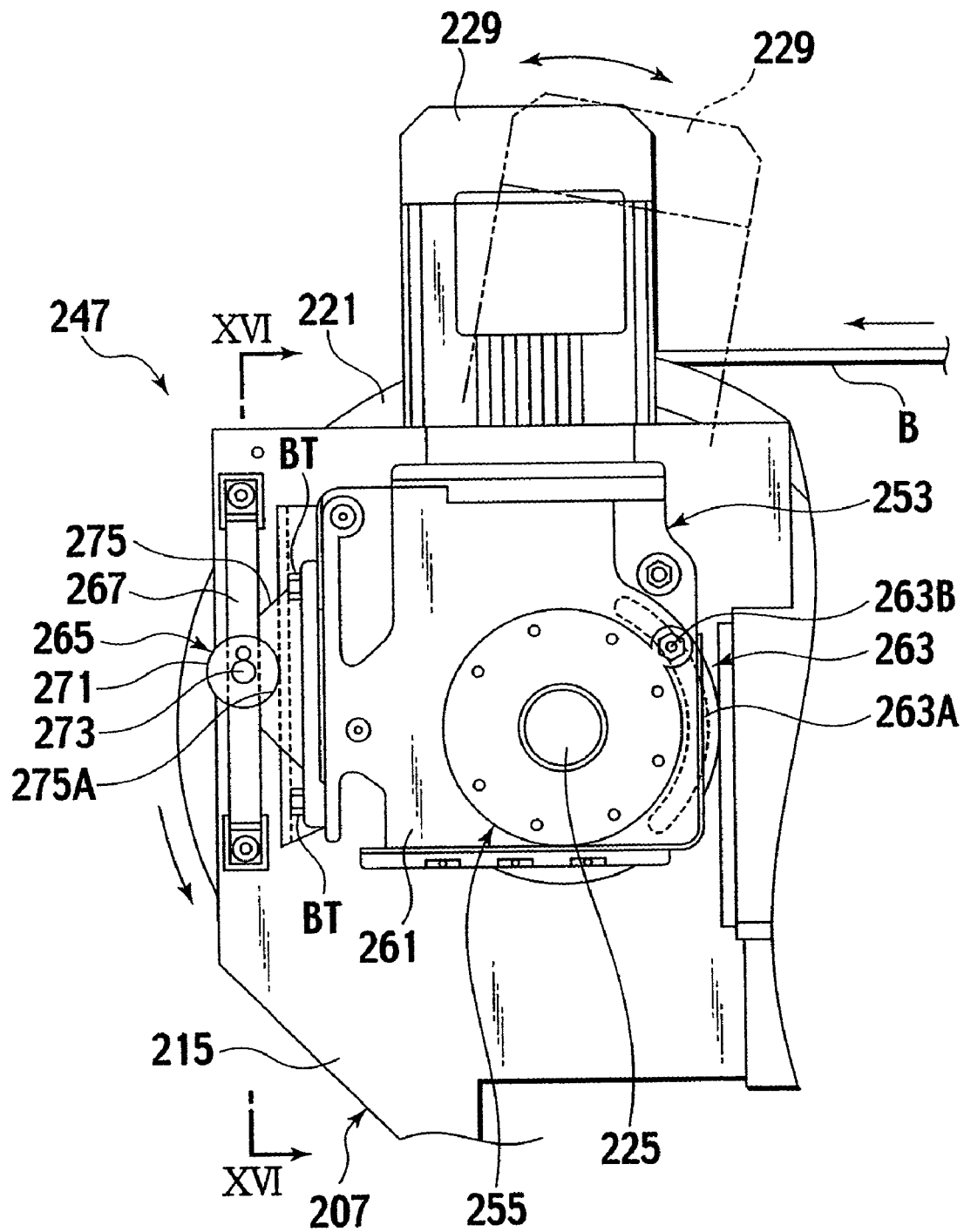
FIG. 15 is a schematic back explanation view of a saw blade driving device in accordance with a third embodiment of the present invention.
Figure 16:
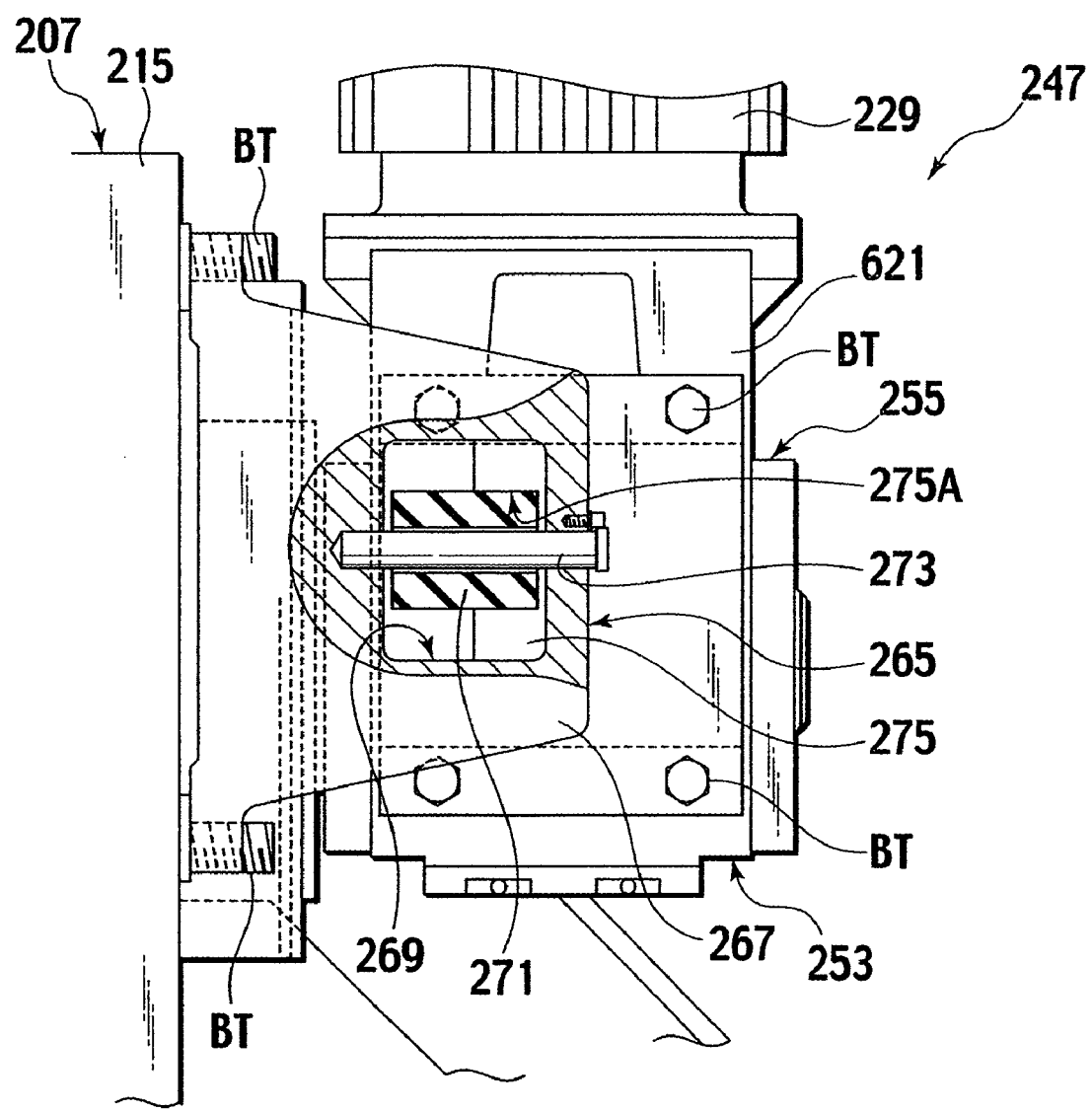
FIG. 16 is a sectional view taken along an arrow line XVI-XVI in FIG. 15.
Figure 17:
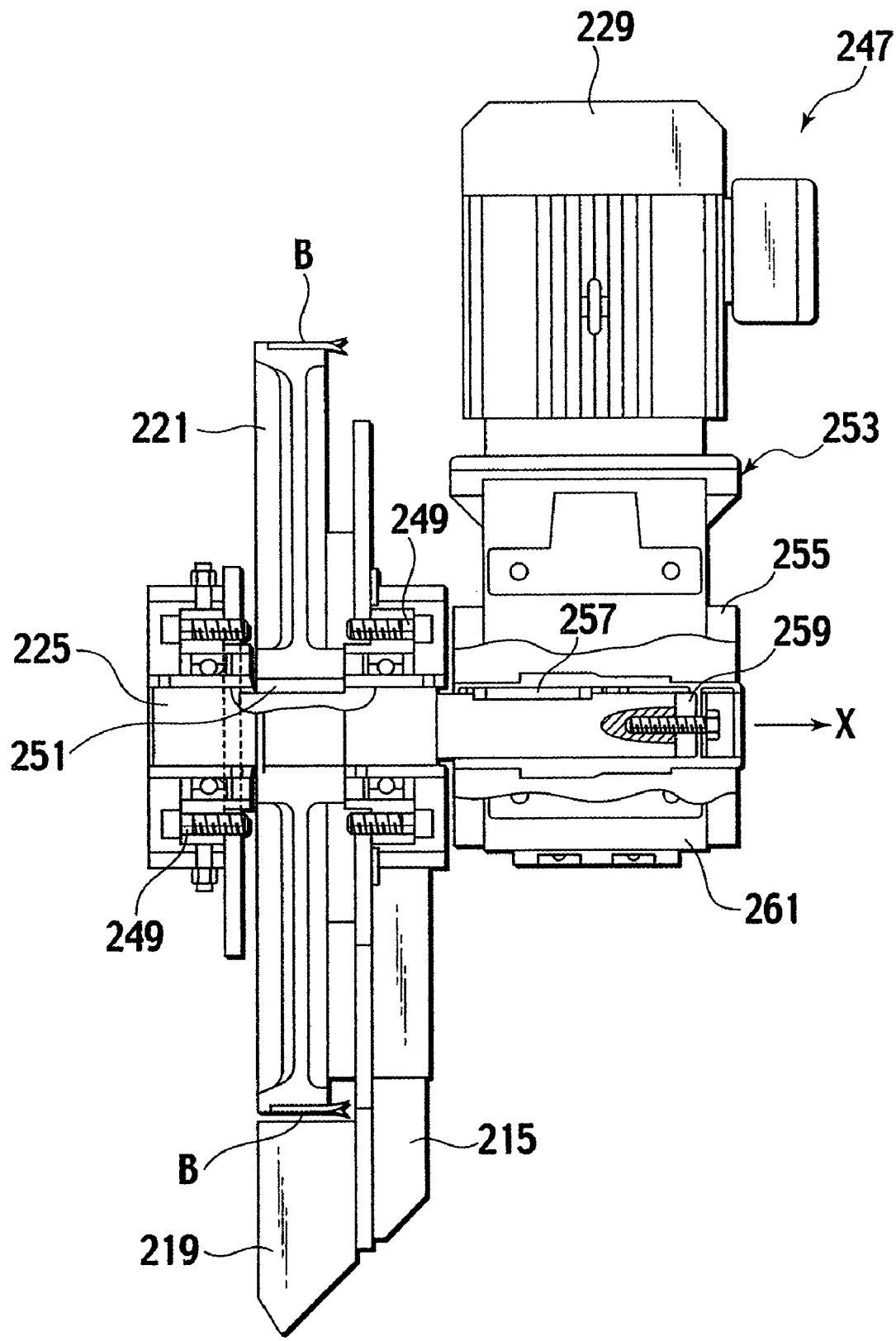
FIG. 17 is a sectional view showing a configuration of a shaft of the driving wheel.

Referring to FIG. 15 to FIG. 17, in the saw blade driving device 247, as shown in FIG. 17, the shaft 225 of the driving wheel 221 is rotatably supported via a pillow bearing 249 provided on the left side of the housing part 215 in FIG. 17, and the driving wheel 221 is inserted into the shaft 225 and coupled and fixed thereto via key 251.

The shaft 225 protrudes from the back face of the housing part 215 (right side in FIG. 17) and a saw blade driving unit 253 is coupled to the protruded part of the shaft 225 so as to rotationally drive the shaft 225 and is provided on the back face side. In this embodiment, the saw blade driving unit 253 is formed of a hollow speed reducer 255 and the saw blade motor 229 linked and coupled to the speed reducer 255 and has a floating structure capable of freely rotating in the saw blade rotating direction.

That is, in the saw blade driving unit 253, the speed reducer 255 is coupled to the protruded part of the shaft 225 through the key 257 and a pressing member 259 provided at the front end of the protruded part of the shaft 225 limits an X direction in FIG. 17. A casing 261 of the speed reducer 255, as shown in FIG. 15, has a floating structure that can be rotated by a guiding part 263 provided on the back face of the housing part 215 in the saw blade rotating direction. For example, a long guiding groove 263A that extends around the shaft 225 in the circumferential direction is provided on the back face of the housing part 215 and a guiding pin 263B is guided by the guiding groove 263A and engages with the casing 261 of the speed reducer 255.

When the work W is cut with the band saw blade B, large shock (reaction) such as cut resistance and impact force is applied to the band saw blade B and a saw blade reaction absorbing device 265 for absorbing and reducing the reaction force is provided on the back face of the housing part 215.

As the saw blade reaction absorbing device 265 in the third embodiment, as shown in FIG. 15, FIG. 16, FIG. 13 and FIG. 14, a torque arm 267 having a thick-plate block structure is fixed to the back face of the housing part 215 so as to be protrudingly provided in the vicinity of the speed reducer 255, the torque arm 267 is provided with a notched window 269 and a buffer member 271 made of a resin material having elasticity, for example, urethane and rubber, as a buffer part is fixed to the notched window 269 by the shaft 273. In more detail, in this embodiment, as shown in FIG. 15, the buffer member 271 is cylindrical and the shaft 273 is inserted into a hole of the buffer member 271 so that the buffer member 271 may be fixedly held by the torque arm 267.

Furthermore, an engaging member 275 having a semicircular engaging recessed part 275A as an engaging part engaging with the outer periphery of the buffer member 271 is fixed to the side face of the casing 261 of the speed reducer 255 (left side face in FIG. 15) with a bolt BT.

With the above-mentioned configuration, rotational driving of the saw blade motor 229 rotates the driving wheel 221, thereby rotationally driving the band saw blade B hung around the driving wheel 221 and the driven wheel 223.

The saw blade housing 7 is lowered by the lifting hydraulic cylinder 211 while the band saw blade B in the cutting region S is vertically guided downwards between the backup unit 235 of the fixed insert 231 and the backup unit 237 of the moving insert 233 and rotationally moved from the side of the moving insert 233 to the side of the fixed insert 231, so that the work W fixed with the reference vise jaw 241 and the movable vise jaw 243 is cut with the band saw blade B.

Due to the rotation of the shaft 225 and the driving wheel 221, the torque of the saw blade motor 229 is transmitted to the band saw blade B via the speed reducer 255. When the work W is cut with the band saw blade B, large shock such as cutting resistance and impact force applied to the band saw blade B causes damage of the band saw blade B as well as vibration and noise. However, the saw blade reaction absorbing device 265 can absorb and reduce the reaction force such as cutting resistance and impact force.

That is, as described above, since the reducer 255 and the saw blade motor 229 (that is, the saw blade driving unit 253) has a floating state relative to the housing part 215 in the saw blade rotating direction, when a large impact load such as cutting resistance and impact force is applied to the band saw blade B, a reaction force is generated around the shaft 225 in the direction reverse to the rotational moving direction of the band saw blade B and the reducer 255 and the saw blade motor 229 rotates in the clockwise direction in FIG. 15 as represented by a chain double-dashed line in FIG. 15.

Correspondingly, the engaging member 275 provided on the side face of the casing 261 of the speed reducer 255 also rotates in the same direction and however, the reaction is absorbed due to the elasticity of the buffer member 271 engaged with the engaging recessed part 275A of the engaging member 275. Thus, the damage of the band saw blade B, vibration and noise that are conventionally generated can be damped or prevented, contributing to the life of the saw blade.

When the reaction force is released, the engaging member 275 returns to an initial position due to the elastic force of the buffer member 271 and thus, the saw blade driving unit 253 returns to an initial position.

Next, a saw blade reaction absorbing device 77 in accordance with a fourth embodiment will be described with reference to figures. The same reference numerals are given to members similar to those in the third embodiment and different features of the members are mainly described. Detailed description of similar features of the members is omitted.

Figure 18:
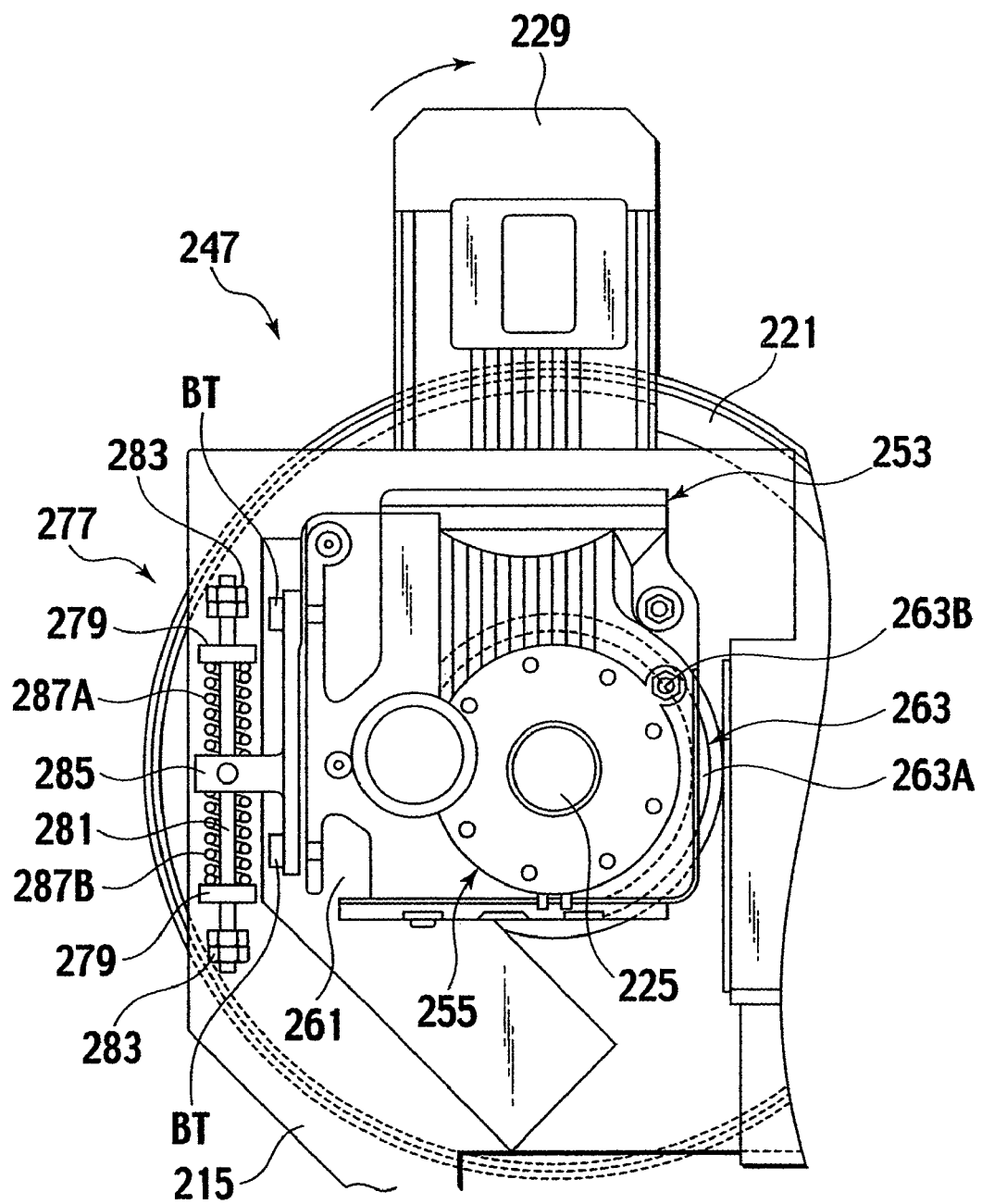
FIG. 18 is a schematic back explanation view of a saw blade driving device in accordance with a fourth embodiment of the present invention.

Referring to FIG. 18, as the saw blade reaction absorbing device 277, two torque blocks 279 that are located with a space therebetween in the vertical direction as opposed to each other in FIG. 18 are disposed in the vicinity of the speed reducer 255 and protrude from the back face of the housing part 215. The two torque blocks 279 are provided with guiding holes not shown and a guide shaft 281 is slidably inserted into the guiding holes. Nut members 283 as stopper parts are screwed into both ends of the guide shaft 281.

An engaging member 85 is fixed to the substantially middle of the guide shaft 281 and a bottom of the engaging member 85 is fixed to the side face (left side face in FIG. 18) of the casing 261 of the speed reducer 255 with the bolt BT. Furthermore, springs 287A, 287B as buffer parts are wound around upper and lower sides of the guide shaft 281 in FIG. 18 and the springs 287A, 287B are provided so as to abut against the side face of the engaging member 285 and the inner side face of the torque block 279, respectively.

With the above-mentioned configuration, since a large shock such as cutting resistance and impact force is applied to the band saw blade B during the cutting of the work W, the saw blade driving unit 253 rotates in the clockwise direction in FIG. 18 due to the reaction force and correspondingly, the engaging member 285 provided at the side face of the casing 261 of the speed reducer 255 also rotates in the same direction. However, the reaction force is absorbed due to the elastic force of the upper spring 287A in FIG. 18. Therefore, the same effects as those in the third embodiment can be obtained. Since the engaging member 285 returns to the initial position when the reaction force is released, the saw blade driving unit 253 returns to the initial position.

Next, a saw blade reaction absorbing device 289 in accordance with a fifth embodiment will be described with reference to figures. The same reference numerals are given to members similar to those in the third embodiment and different features of the members are mainly described. Detailed description of similar features of the members is omitted.

Figure 19:
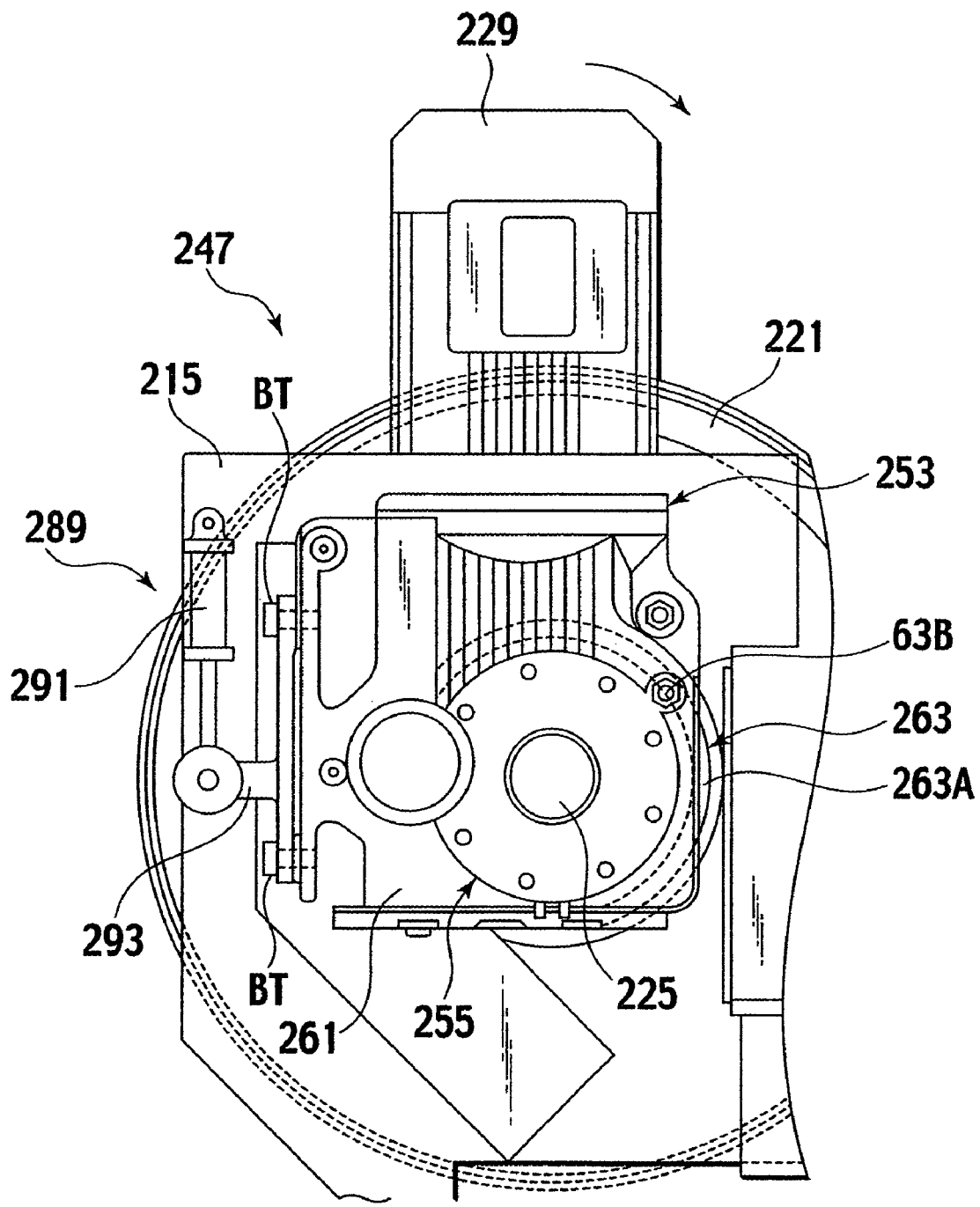
FIG. 19 is a schematic back explanation view of a saw blade driving device in accordance with a fifth embodiment of the present invention.

Referring to FIG. 19, as the saw blade reaction absorbing device 289, a spring with damper 291 as a damper device such as a gas spring as a buffer device is located in the vicinity of the speed reducer 55 at its upper side in FIG. 19 and pivotally supported by the back face of the housing part 215. On the other hand, the engaging member 293 is fixed to the side face (left side face in FIG. 19) of the casing 261 of the speed reducer 255 with the bolt BT and the front end of the engaging member 293 is pivotally supported by one end of the spring with damper 291 and coupled thereto.

With the above-mentioned configuration, since a large shock such as cutting resistance and impact force is applied to the band saw blade B during the cutting of the work W, the saw blade driving unit 253 rotates in the clockwise direction in FIG. 19 due to the reaction force and correspondingly, the engaging member 293 provided at the side face of the casing 261 of the speed reducer 255 also rotates in the same direction. However, the reaction force is absorbed due to the elastic force of the spring with damper 291 in FIG. 19. Therefore, the same effects as those in the third embodiment can be obtained. Since the engaging member 293 returns to the initial position when the reaction force is released, the saw blade driving unit 253 returns to the initial position.

Next, a saw blade reaction absorbing device 295 in accordance with a sixth embodiment will be described with reference to figures. The same reference numerals are given to members similar to those in the third embodiment and different features of the members are mainly described. Detailed description of similar features of the members is omitted.

Figure 20:
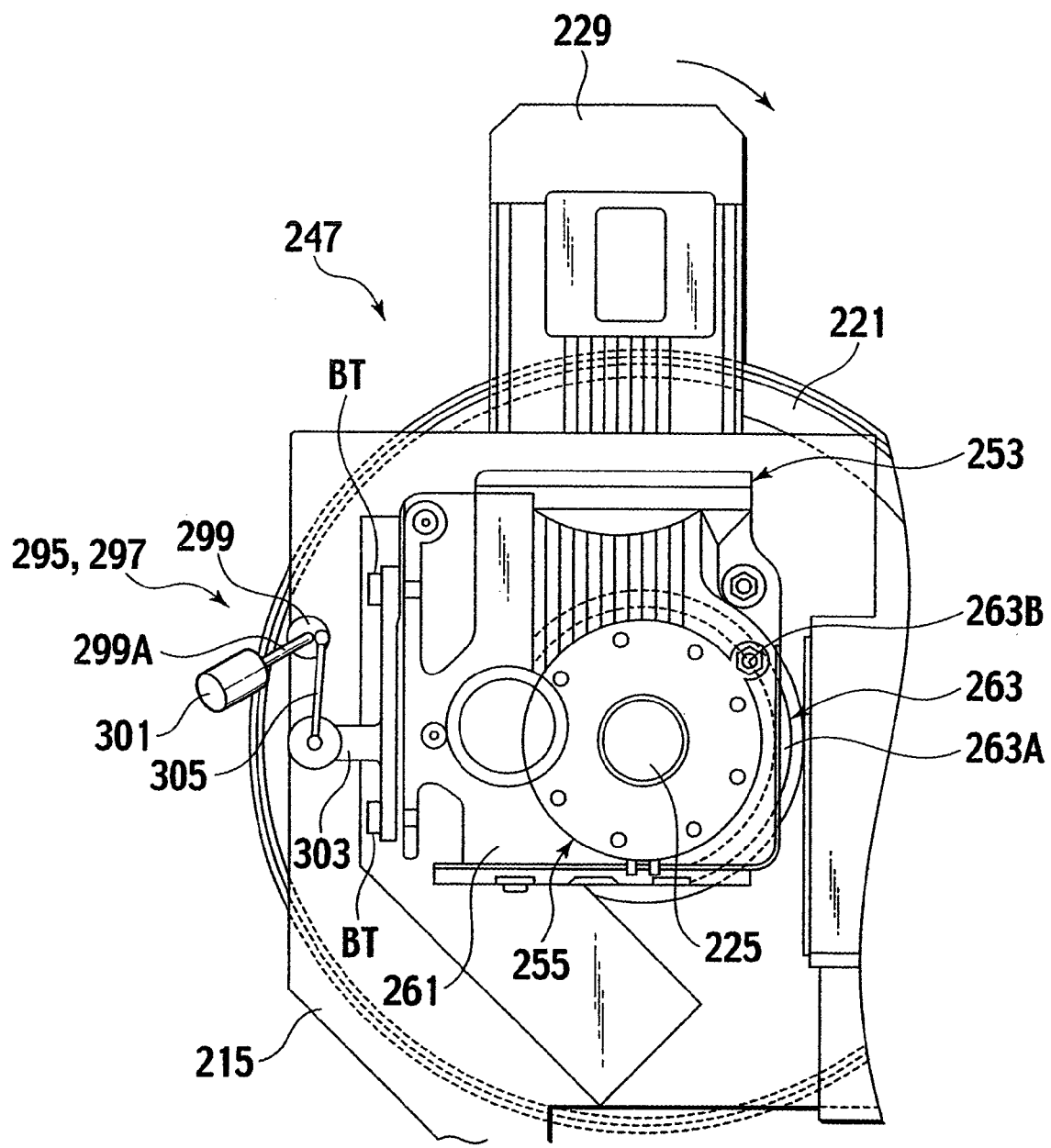
FIG. 20 is a schematic back explanation view of a saw blade driving device in accordance with a sixth embodiment of the present invention.

Referring to FIG. 20, as the saw blade reaction absorbing device 295, a vibration generating device 297 for applying vibration to the saw blade driving unit 253 is provided and the vibration generating device 297 forms a so-called buffer part.

As the vibration generating device 297, a disc 299 as a rotating body is located in the vicinity of the speed reducer 255 and rotatably provided on the back face of the housing part 215 with the shaft 299A and the disc 299 is rotationally driven by a small-sized motor 301 linked and coupled to the shaft 299A. On the other hand, the engaging member 303 is fixed to the side face (left side face in FIG. 20) of the casing 261 of the speed reducer 255 with the bolt BT, a front end of the engaging member 303 is pivotally supported by one end of the coupling member 305 forming a link member and the other end of the coupling member 305 is pivotally supported by one point on the outer periphery of the disc 299 to form a link mechanism.

Although FIG. 20 shows as if the disc 299 is coupled to the small-sized motor 301 on the near side of the sheet, the small-sized motor 301 is actually linked and coupled to the shaft 299A of the disc 299 via a rotation transmitting device, for example, and the pivoted part of the coupling member 305 with the disc 299 rotate with the rotation of the disc 299, thereby allowing the coupling member 305 to reciprocate.

With the above-mentioned configuration, the disc 299 is rotationally driven by the small-sized motor 301 and correspondingly, the engaging member 303 reciprocates via the coupling member 305. Due to the reciprocation, the casing 261 of the speed reducer 255 rotationally reciprocates around the shaft 225, generating minute vibration. Thus, since the band saw blade B vibrates in the cutting direction, large shock such as cutting resistance and impact force applied to the band saw blade B during cutting of the work W can be reduced.

By installing the buffer material (not shown) such as rubber and urethane in the middle of the coupling member 305, the reaction force generated during cutting of the work W is absorbed by the buffer material more effectively.

The present invention is not limited to the third to sixth embodiments and can be performed in the other modes with appropriate modifications. Although this embodiment describes the horizontal band saw machine as a saw machine, a vertical band saw machine and the other band saw machines may be adopted.

Next, a seventh embodiment of the present invention will be described in detail with reference to figures.

Figure 27:
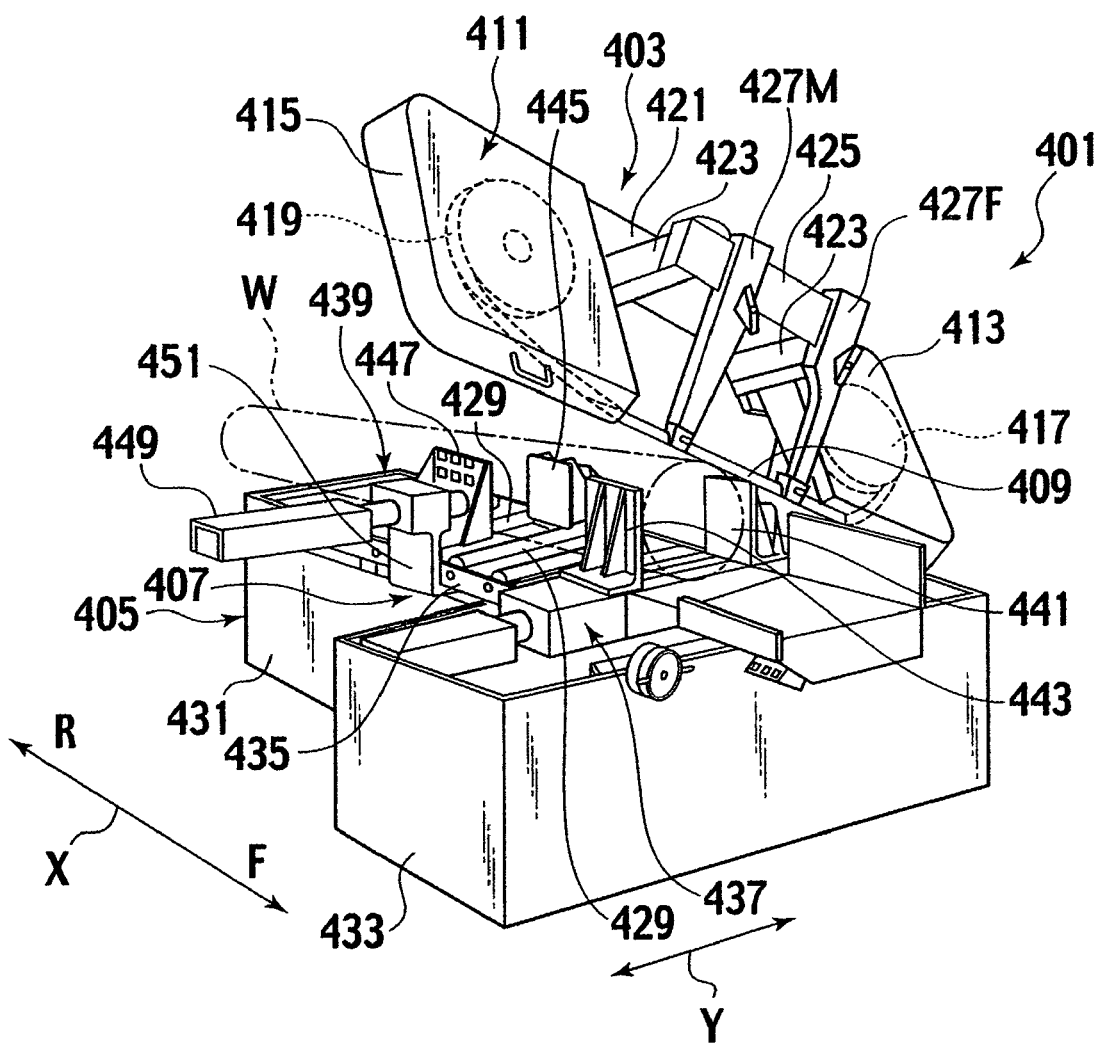
FIG. 27 is a perspective view of the horizontal band saw machine as a band saw machine.

Referring to FIG. 27, a horizontal band saw machine 401 as a band saw machine includes a cutting part 403 for sending and cutting the work W by a certain distance, a supporting part 405 for mounting and supporting the work W thereon and a vise mechanism 407 for fixedly holding the work W and sending the work W by a certain distance.

The cutting part 403 is formed of a band saw blade 409 and a saw blade housing 411, and in the saw blade housing 411 in FIG. 27, a driving wheel 417 and a driven wheel 419 are rotatably supported by a right saw blade housing part 413 and a left saw blade housing part 415, respectively, and the band saw blade 409 is wound around the driving wheel 417 and the driven wheel 419. the right saw blade housing part 413 and the left saw blade housing part 415 are coupled to each other via a beam member 421 and the beam member 421 is attached to a coupling frame 425 extending in the cross direction in FIG. 27 via a plurality of supporting frames 423. A movable saw blade guide 427M that can move in the horizontal direction is provided on the left side of the coupling frame 425 and a fixed saw blade guide 427F is provided on the right side of the coupling frame 425.

In the supporting part 405, a plurality of supporting rollers 429 for mounting and supporting the work W are rotatably provided on a frame 31 at appropriate interval and a table 433 is disposed in front of the frame 31 and on the right side in FIG. 27. The work W is sent from the backward in the X-axis direction (horizontal direction in FIG. 27) to the forward in the X-axis direction and fixedly held by the vise mechanism 407. The supporting rollers 429 each are rotatably supported by a roller frame 435 provided separately from the frame 431 over the whole length of the sending path of the work W.

The vise mechanism 407 is formed of a main unit vise 437 and sending vise 439. The main unit vise 437 includes a main unit fixed vise jaw 441 and a main unit movable vise jaw 443 that can reciprocate in the direction of approaching to or separating from the main unit fixed vise jaw 441 and is disposed at the immediately before the cutting position of the band saw blade 409. Like the main unit vise 437, the sending vise 439 includes a sending fixed vise jaw 445 and a sending movable vise jaw 447 and the sending vise 443 can approach to or separate from the main unit vise 437 (advance or retreat relative to the main unit vise 437). The sending movable vise jaw 447 can freely advance or retreat relative to the sending fixed vise jaw 445 via a fluid pressure mechanism 449 such as a hydraulic cylinder. The fluid pressure mechanism 449 is supported by a vise bed 451 so as to be movable in the Y-axis direction.

Hereinafter, referring to figures, positional relationship between the cut work W and the band saw blade 505 in the band saw machine of the present invention will be described. As shown in FIG. 25(A), for example, in the state where the work W is cramped between a rear vise 501 formed of a fixed vise jaw 501F and a moving vise jaw 501M and a front vise 503 formed of a fixed vise jaw 503F and a moving vise jaw 503M in the horizontal band saw machine, the work W is cut by lowering the band saw blade 505 from above, for example. Then, after cutting, as shown in FIG. 25(B), the rear vise 501 and the front vise 503 is moved backwards and forwards, respectively, thereby separating from the band saw blade 505 so that the band saw blade 505 may return to an initial position.

Figure 26:
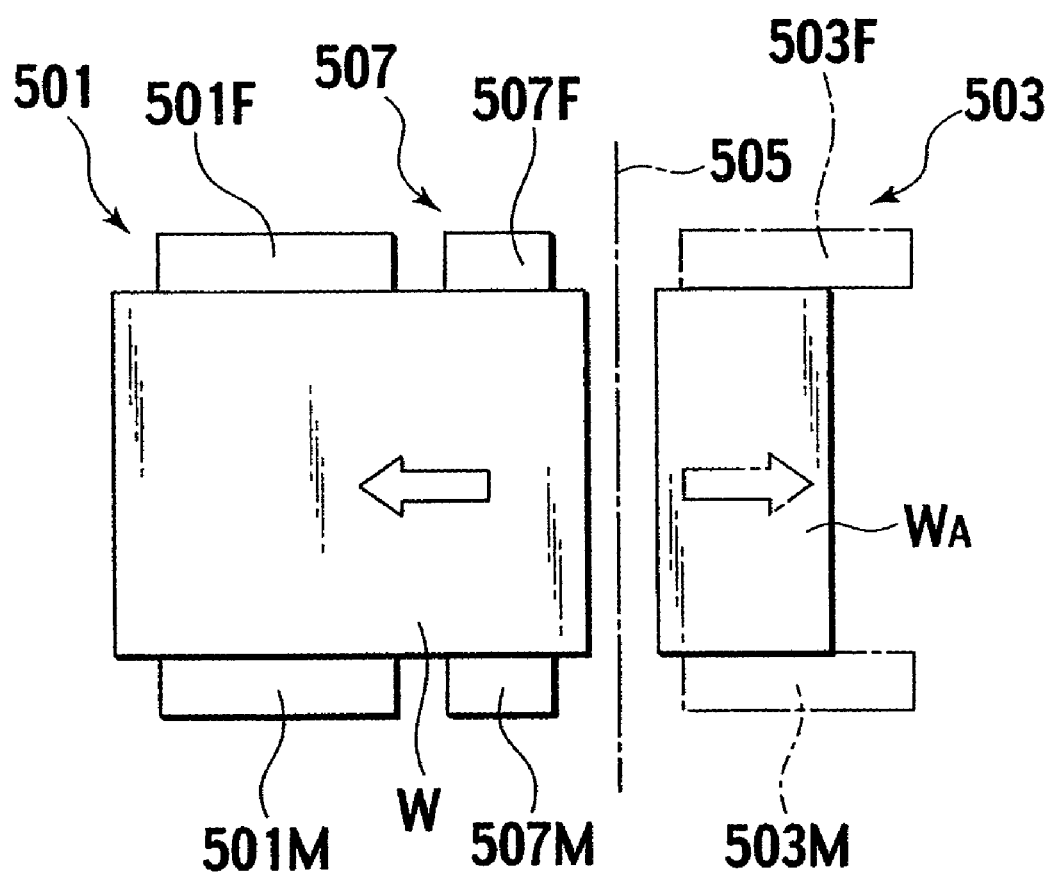
FIG. 26 is a plan view showing the state where the work is moved with the main unit vise, the sending vise and the front vise after cutting.

In the case as shown in FIG. 26, that is, the main unit vise 507 including the fixed vise jaw 507F and the moving vise jaw 507M is provided between the rear vise 501 and the cutting position where the band saw blade 505 passes through, the work W can be separated from the band saw blade 505 by the rear vise 501, while a cut material WA cannot be separated from the band saw blade 505. A vise that can move in the sending direction needs to be provided at the side of the cut material WA across the band saw blade 505, resulting in an increase of costs and space.

Figure 21:
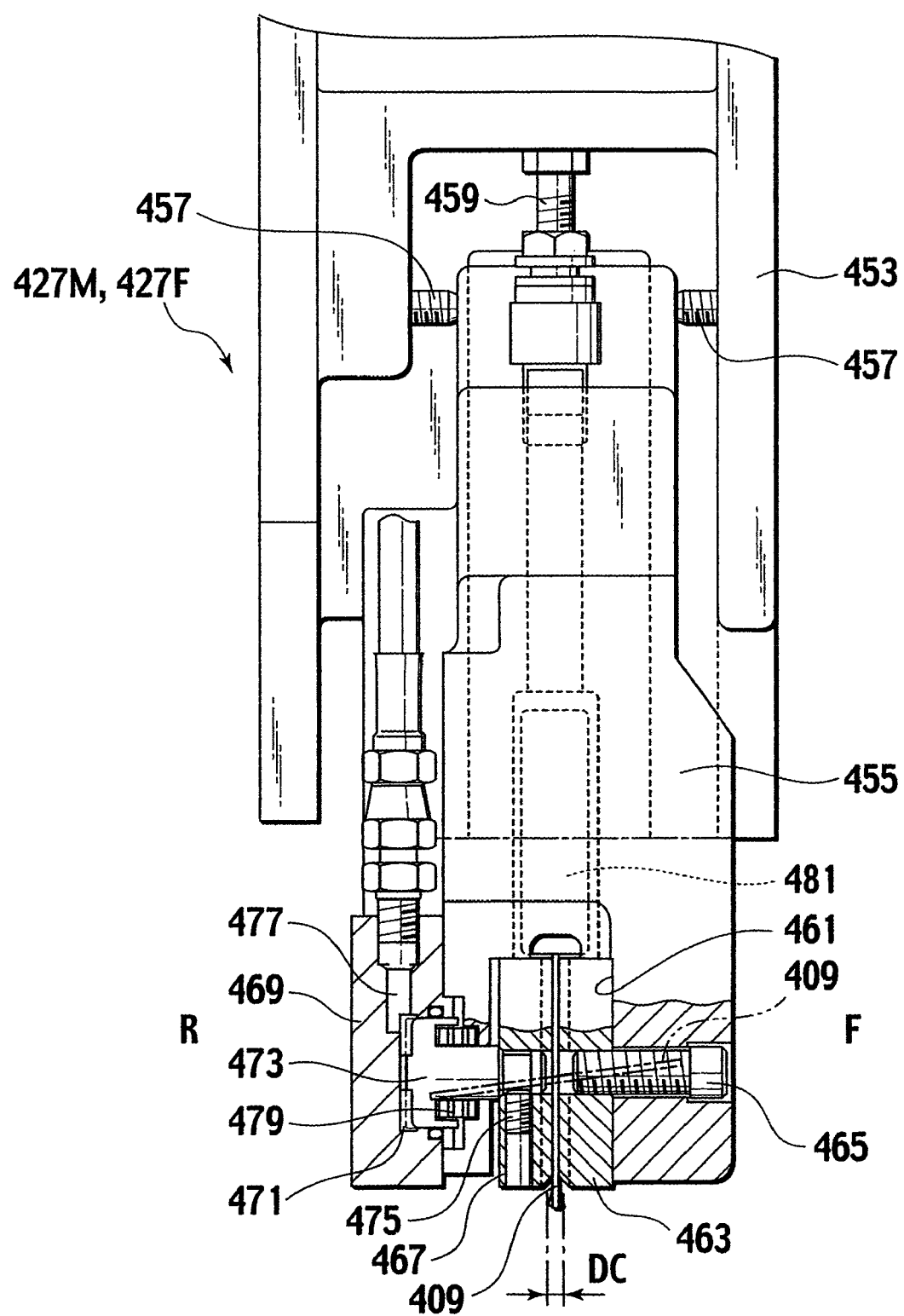
FIG. 21 is a side enlarged view of a fixed saw blade guide and a movable saw blade guide and shows the state where the band saw blade is guided by a front insert and a rear insert.

FIG. 21 shows a modification of the movable saw blade guide 427M and the fixed saw blade guide 427F. Hereinafter, details thereof will be described.

In the movable saw blade guide 427M and the fixed saw blade guide 427F, as shown in FIG. 21, the guide main unit 455 is provided in the lower end of a guiding frame 453, the upper portion of the guide main unit 455 is supported by front and rear screws 457 provided at the inner side of the guiding frame 453 and the upper end of a screw 459 attached to the upper face of the guide main unit 455 hits against the lower face of the upper portion of the guiding frame 453.

A reverse U-like groove 461 opened to the downside is formed in the lower portion of the guide main unit 455. A front insert 463 in the front portion of the groove 461 (right side in FIG. 21) is fixed to the lower part of the guide main unit 455 with a bolt 465 and a rear insert 467 in the rear portion of the groove 461 (left side in FIG. 21) is provided in the lower portion of the guide main unit 455 so as to movable in the cross direction relative to the front insert 463. A block 469 is provided in the lower portion of the guide main unit 455 on the left side in FIG. 21. A hydraulic chamber 471 of the hydraulic cylinder is formed between the block 469 and the guide main unit 455. A front end of a piston rod 473 is fixed to the rear insert 467 with a screw 475. The hydraulic chamber 471 is connected to a line 477 provided in the block 469. The piston rod 473 is urged to the left side in FIG. 21 due to an urging force of a spring 479 such as a coil spring and a disc spring as an elastic member.

The band saw blade 409 bent by 90 degrees, for example, enters into between the front insert 463 and the rear insert 467 and a pressing roller 481 is provided in the guide main unit 455 behind the band saw blade 409 (upper side in FIG. 21).

In FIG. 21, a cut groove (width of the groove cut with the saw blade) is shown as DC.

Figure 22:
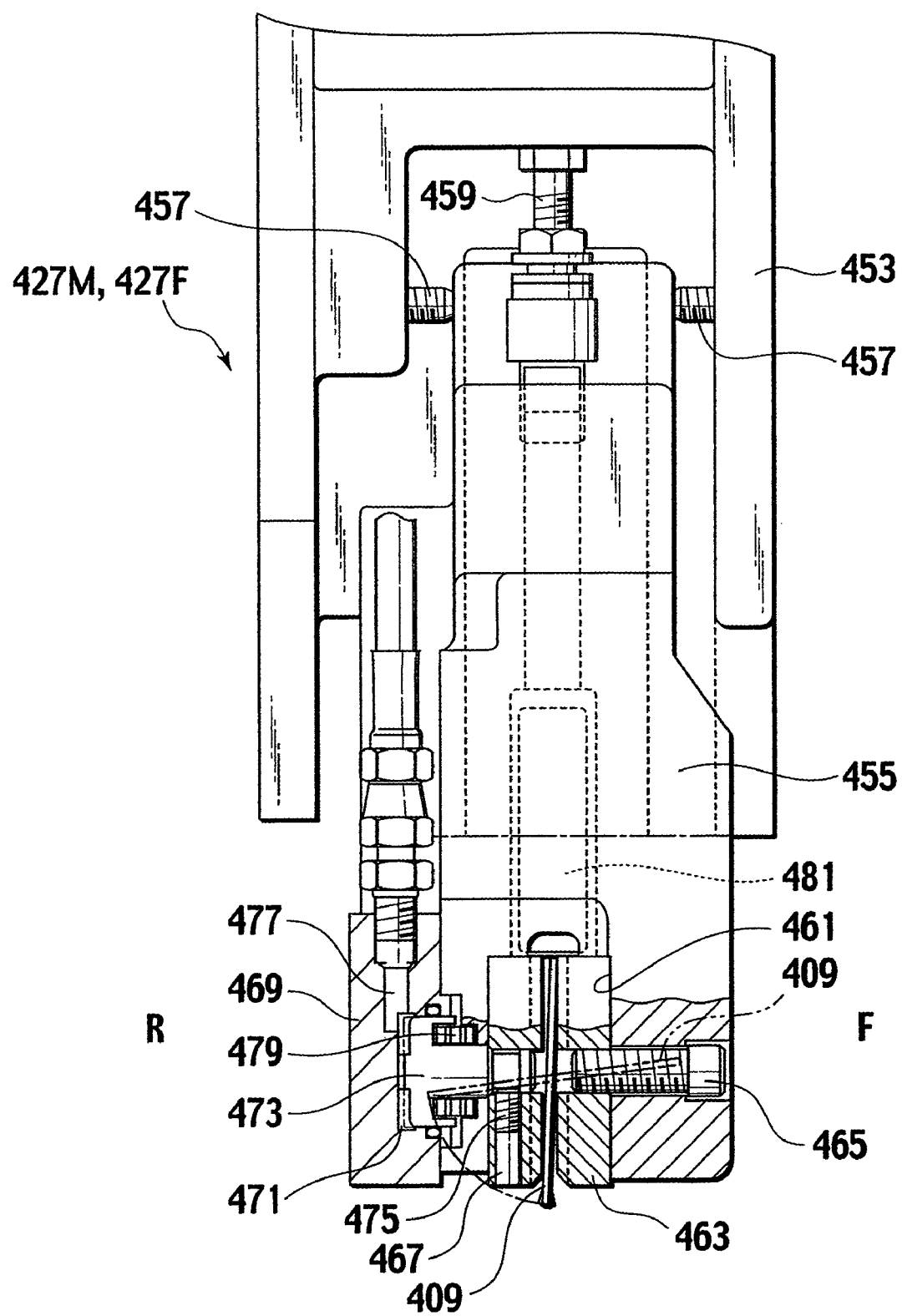
FIG. 22 is a side enlarged view of the fixed saw blade guide and the movable saw blade guide and shows the rear insert is opened relative to the front insert.

With the above-mentioned configuration, since pressure oil supplied to the line 477 is sent to the hydraulic chamber 471 and the piston rod 473 moves to the right in FIG. 21 against the urging force of the spring 479, the rear insert 467 also moves forward (right side in FIG. 21). As a result, as shown in FIG. 21, due to the operation of the front insert 463 and the rear insert 467, the band saw blade 9 is guided. By removing the pressure oil from the hydraulic chamber 471, the piston rod 73 moves to the left in FIG. 1 by the urging force of the spring 479 and as shown in FIG. 22, the rear insert 467 moves rearwards relative to the front insert 63. As a result, the band saw blade 409, as shown in FIG. 22, is inclined diagonally to the upper right with an upper end of the front insert 463 as a fulcrum.

As shown in FIG. 23(A) and FIG. 23(B), after the work W is sent to the right by a desirable distance by the sending fixed vise jaw 445 and the sending movable vise jaw 447 of the sending vise 443, the work W is held between the main unit fixed vise jaw 439 and the main unit movable vise jaw 441 of the main unit vise 437. Then, by lowering the band saw blade 409, cutting operation is performed. After that, when the band saw blade 409 returns to the initial position, as shown in FIG. 24(A), the sending vise 443 moves the work W rearwards (left side in FIG. 24(A)) and the rear insert 467 is moved rearwards (left side in FIG. 22) relative to the front insert 463, thereby opening the rear insert 467. Due to the twist return force of the band saw blade 409, as represented by a chain double-dashed line in FIG. 24(B), the saw blade 409 is inclined with the upper end of the front insert 463 as a fulcrum so that the blade edge of the band saw blade 409 can be removed from the cut faces of both the work W and the cut material WA and the band saw blade 409 can be returned to the initial position by rising the band saw blade 409. Therefore, there is no need to provide any dedicated structure such as moving structure of the main unit vise 437 and the removing structure of the band saw blade so as not to bring the work W into contact against the band saw blade 409.

Furthermore, since the scope in which the rear insert 467 moves in the cross direction is set as a scope in which the edge of the moving band saw blade 409 is allowed to separate from the cut face, the rear insert 467 need not be further moved rearwards.

The present invention is not limited to the above-mentioned embodiments and can be performed in the other modes with appropriate modifications. Although the horizontal band saw machine is used as an example of the band saw machine, a vertical band saw machine may be adopted. Although the rear insert 467 is moved in the cross direction relative to the front insert 463 in the above-mentioned embodiments, the front insert 463 may be moved in the cross direction relative to the rear insert 467.

Whole contents of Japanese Patent Application No. 2003-376790 (filed on Nov. 6, 2003), Japanese Patent Application No. 2004-147415 (filed on May 18, 2004), Japanese Patent Application No. 2004-139690 (filed on May 10, 2004) and Japanese Patent Application No. 2002-204160 (filed on Jul. 12, 2002) are incorporated herein by reference.

The present invention is not limited to the description in the first to seventh embodiments of the present invention and can be performed in other various modes.

We claim:

1. A band saw machine, in which an endless band saw blade is hung around a driving wheel and a driven wheel rotatably supported by a saw blade housing capable of vertically moving, wherein:
   a pair of guide posts for vertically guiding the saw blade housing is provided between the driving wheel and the driven wheel;
   a vertically movable actuator moving the saw blade housing in a vertical direction;
   an upper traveling part of the band saw blade is disposed on one side of the pair of guide posts;
   a lower traveling part of the band saw blade is disposed on an opposite side of the pair of guide posts, and
   a tension applier that applies tension to the band saw blade by moving the driven wheel in a direction separating from the driving wheel,
   wherein when viewed from a side of the band saw machine, a distance from the center point of each wheel to a closest surface of a guidepost is equal to or less than a width of each guide post,
   wherein when viewed from the side of the band saw machine, the center point of each wheel is located between the vertically movable actuator and each guide post, and
   wherein when viewed from the side of the band saw machine, the driving wheel and the driven wheel are inclined so that the upper parts of the driving wheel and the driven wheel are located to the rear of the guide posts, and the lower parts of the driving wheel and the driven wheel are located in front of the guide posts.

2. A band saw machine according to claim 1, wherein
   a blade of the upper traveling part of the band saw blade is bent to be vertically oriented downwards; and
   a center of gravity is positioned at a lower part of the inclined saw blade housing.

3. A band saw machine according to claim 2, wherein
   the saw blade housing is opened to an upside and formed in the shape of C; and
   upper ends of the pair of guide posts are integrally coupled to each other with a coupling member.

* * * * *